(12) United States Patent
Dinan

(10) Patent No.: US 10,015,757 B2
(45) Date of Patent: Jul. 3, 2018

(54) UPLINK TIMING ADVANCE CONFIGURATION OF A WIRELESS DEVICE AND BASE STATION

(71) Applicant: Ofinno Technologies, LLC, Herndon, VA (US)

(72) Inventor: Esmael Hejazi Dinan, Herndon, VA (US)

(73) Assignee: Ofinno Technologies, LLC, Herndon, VA (US)

( * ) Notice: Subject to any disclaimer, the term of this patent is extended or adjusted under 35 U.S.C. 154(b) by 115 days.

(21) Appl. No.: 15/262,889

(22) Filed: Sep. 12, 2016

(65) Prior Publication Data

US 2017/0078994 A1 Mar. 16, 2017

Related U.S. Application Data

(60) Provisional application No. 62/218,465, filed on Sep. 14, 2015.

(51) Int. Cl.
*H04W 24/02* (2009.01)
*H04W 56/00* (2009.01)

(52) U.S. Cl.
CPC .............. *H04W 56/0005* (2013.01)

(58) Field of Classification Search
None
See application file for complete search history.

(56) References Cited

U.S. PATENT DOCUMENTS

| 2014/0286240 | A1* | 9/2014 | Kim | H04W 56/0005 370/328 |
| 2014/0301317 | A1* | 10/2014 | Xu | H04W 72/00 370/329 |
| 2015/0098400 | A1* | 4/2015 | Lee | H04W 56/0045 370/329 |
| 2015/0327198 | A1* | 11/2015 | Axmon | H04W 56/0045 370/336 |
| 2017/0230913 | A1* | 8/2017 | Ouchi | H04W 52/30 |

OTHER PUBLICATIONS

3GPP TSG RAN WG1 Meeting #82 R1-153788, Beijing, China, Aug. 24-28, 2015, Source: Huawei, HiSilicon, Title: Support for UE synchronization on a LAA Scell.
3GPP TSG RAN WG1 Meeting #82 R1-154009, Beijing, China, Aug. 24-28, 2015, Source: Kyocera, Title: DL Transmission Design for LAA.

(Continued)

*Primary Examiner* — Duc T Duong
(74) *Attorney, Agent, or Firm* — David Grossman; Esmael Dinan

(57) ABSTRACT

A wireless device receives at least one message comprising configuration parameters of a plurality of cells grouped into a plurality of timing advance groups (TAGs). A TAG is configurable to consist of one or more downlink-only cells if the wireless device has a first capability, otherwise each TAG comprises one or more downlink-uplink cells. The wireless device receives at least one timing advance command (TAC) for a first TAG. The wireless device applies the TAC to uplink transmission timing of at least one downlink-uplink cell in the first TAG.

20 Claims, 19 Drawing Sheets

(56) References Cited

OTHER PUBLICATIONS

3GPP TSG RAN WG1 Meeting #82 R1-154020, Beijing, China, Aug. 24-28, 2015, Source: Panasonic, Title: AGC and time/frequency synchronization for transmission burst.
3GPP TSG RAN WG1 #82 R1-154146, Beijing, China, Aug. 24-28, 2015, Source: Samsung, Title: LAA synchronization.
3GPP TSG RAN WG1 #82 R1-154149, Beijing, China, Aug. 24-28, 2015, Source: Samsung, Title: LAA fast carrier selection.
3GPP TSG RAN WG1 meeting #82 R1-154267, Beijing, China, Aug. 24-28, 2015, Source: LG Electronics, Title: DL synchronization and AGC issues in LAA.
3GPP TSG RAN WG1 Meeting #82 R1-154326, Beijing, China, Aug. 24-28, 2015, Source: Huawei, HiSilicon, Title: L1 indication for UE support of fast carrier selection.
3 GPP TSG RAN WG1 82 Meeting R1-154327, Beijing, China, Aug. 24-28, 2015, Source: Huawei, HiSilicon, Title: UE support of carrier selection for LAA.
3 GPP TSG RAN WG1 Meeting #82 R1-154347, Beijing, China, Aug. 24-28, 2015, Source: Huawei, HiSilicon, Title: Carrier configuration for UE support of carrier selection.
3GPP TSG RAN WG1#82 R1-154593, Beijing, China, Aug. 24-28, 2015, Source: Motorola Mobility, Title: Activation/Deactivation procedures for LAA Scells.
3GPP TSG RAN WG1 Meeting #82 R1-154635, Beijing, China, Aug. 24-28, 2015, Source: Ericsson, Title: Carrier Selection for LAA.
3GPP TSG-RAN WG2 #78 Tdoc R2-122584, Prague, Czech Republic, May 21-25, 2012, Source: Ericsson, ST-Ericsson, Title: Timing Advance value initialization.
3GPP TSG-RAN WG2 #79 Tdoc R2-123804, Qingdao, China, Aug. 13-17, 2012, Source: Ericsson, ST-Ericsson, Title: Clarification of TA value maintenance at TA timer expiry.
3GP TSG-RAN WG2 #79 Tdoc R2-123805, Qingdao, China, Aug. 13-17, 2012, Source: Ericsson, ST-Ericsson, Title: Timing Advance value initialization.
3GPP TSG-RAN WG2 Meeting #91 R2-153313, Beijing, China, Aug. 24-28, 2015, Source: Huawei, HiSilicon, Title: Supported functionalities and parameters for LAA cell.
3GPP TS 36.213 V12.5.0 (Mar. 2015), Technical Specification, 3rd Generation Partnership Project; Technical Specification Group Radio Access Network; Evolved Universal Terrestrial Radio Access (E-UTRA); Physical layer procedures (Release 12).
3GPP TS 36.300 V12.4.0 (Dec. 2014), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).
3GPP TS 36.321 V12.4.0 (Dec. 2014), Technical Specification, 3rd Generation Partnership Project; Technical Specification Group Radio Access Network; Evolved Universal Terrestrial Radio Access (E-UTRA); Medium Access Control (MAC) protocol specification (Release 12).
3GPP TR 36.889 V1.0.1 (Jun. 2015), Technical Report, 3rd Generation Partnership Project; Technical Specification Group Radio Access Network; Study on Licensed-Assisted Access to Unlicensed Spectrum; (Release 13).

\* cited by examiner

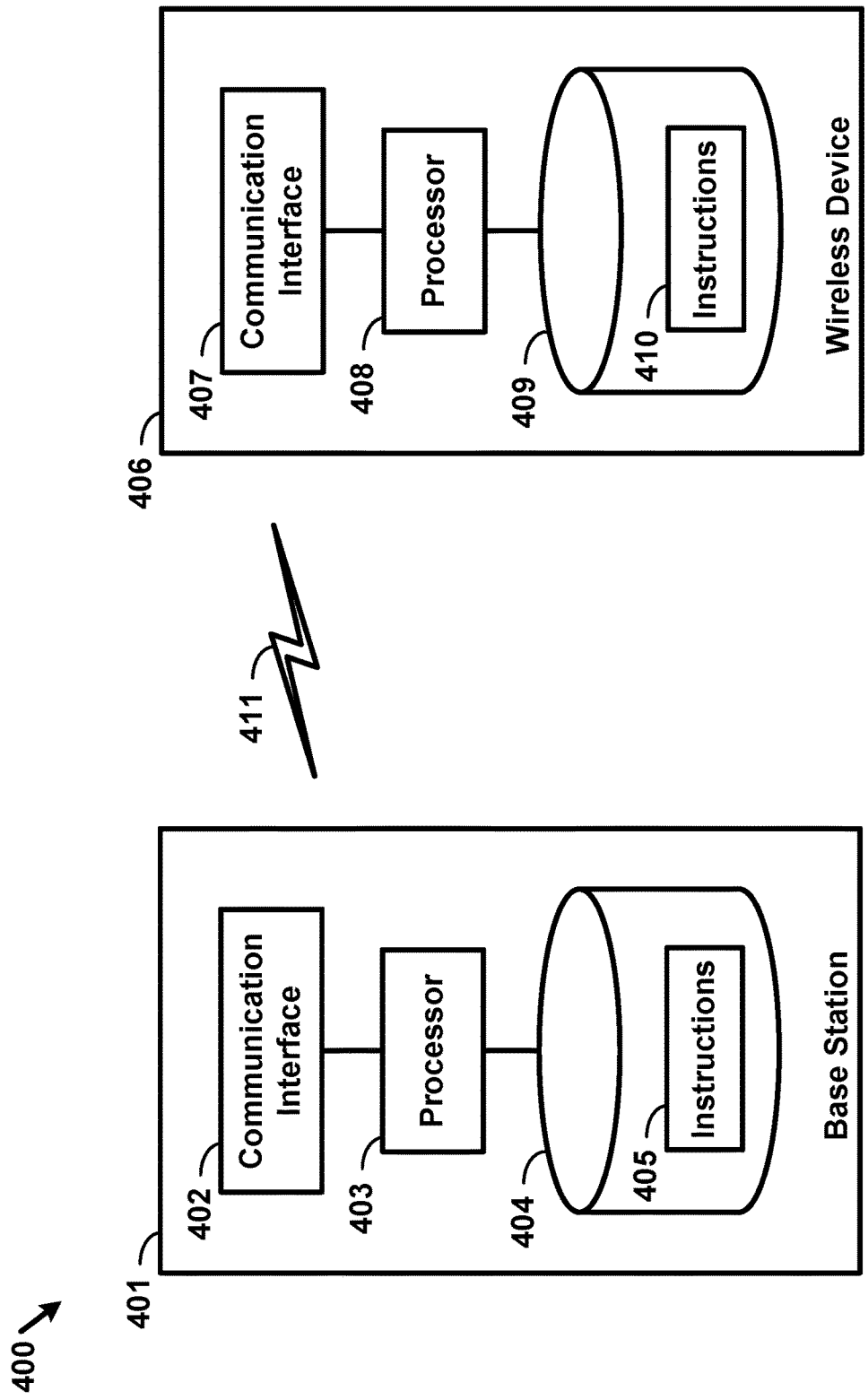

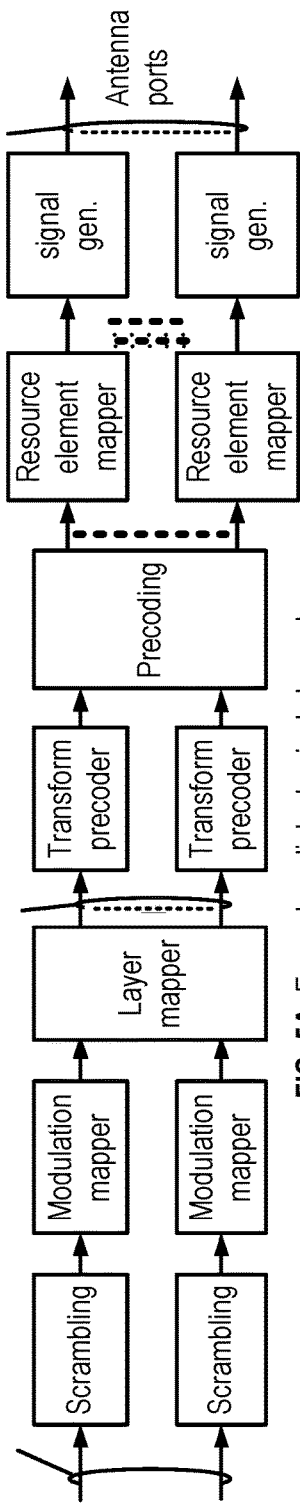
FIG. 5A Example uplink physical channel
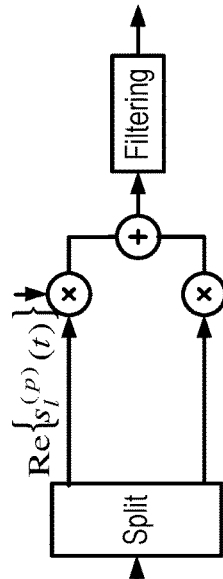
FIG. 5B Example uplink modulation
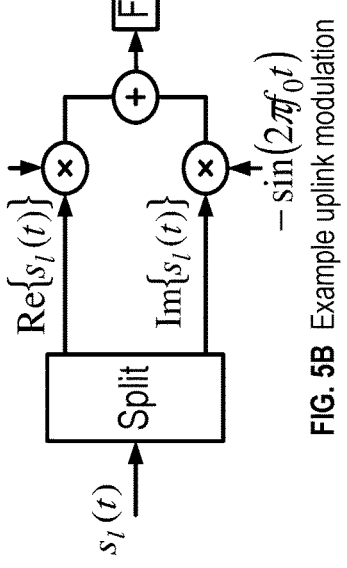
FIG. 5D Example downlink modulation
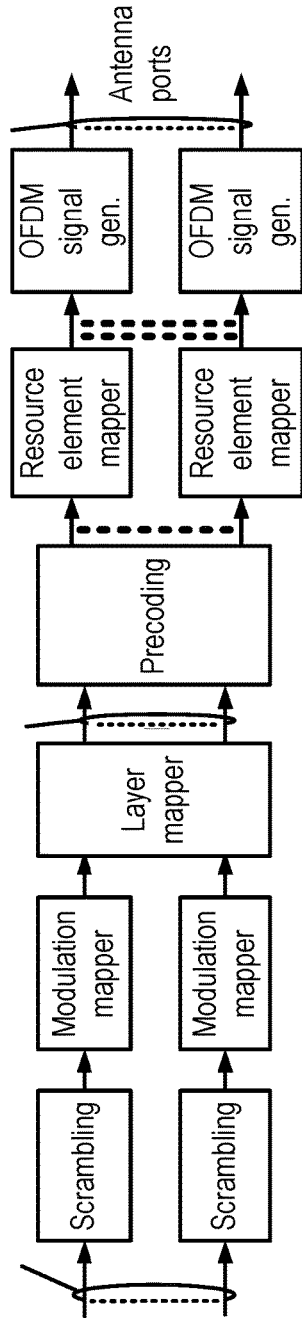
FIG. 5C Example downlink physical channel Dual-Connectivity at eNB Dual-Connectivity- two MAC entities at UE side

FIG. 13

Signals received from both LAA cell1 and LAA cell2

UPLINK TIMING ADVANCE CONFIGURATION OF A WIRELESS DEVICE AND BASE STATION

CROSS-REFERENCE TO RELATED APPLICATIONS

This application claims the benefit of U.S. Provisional Application No. 62/218,465, filed Sep. 14, 2015, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 4 is a block diagram of a base station and a wireless device as per an aspect of an embodiment of the present invention.

FIG. 5A, FIG. 5B, FIG. 5C and FIG. 5D are example diagrams for uplink and downlink signal transmission as per an aspect of an embodiment of the present invention.

FIG. 13 is an example diagram depicting signal timing of one or more cells as per an aspect of an embodiment of the present invention.

DETAILED DESCRIPTION OF EMBODIMENTS

Figure 1:
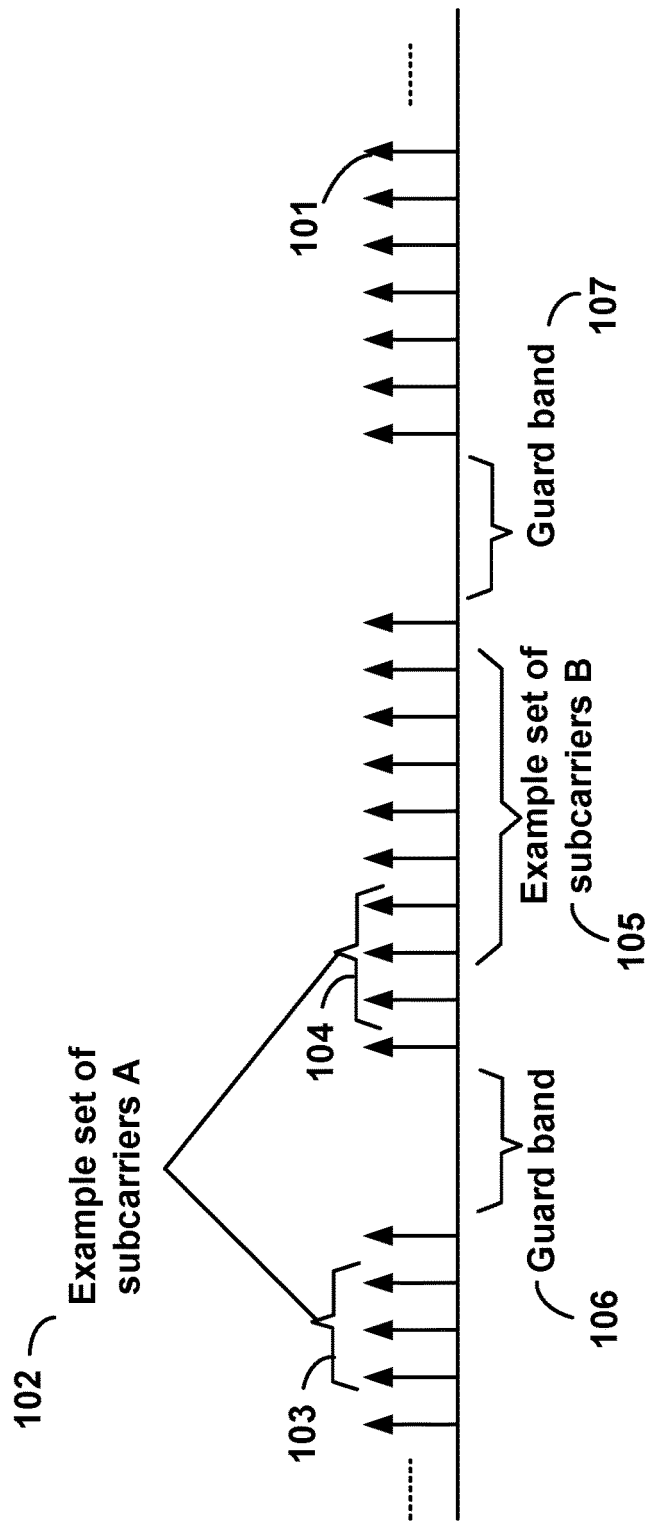
FIG. 1 is a diagram depicting example sets of OFDM subcarriers as per an aspect of an embodiment of the present invention.

Example embodiments of the present invention enable operation of carrier aggregation. Embodiments of the technology disclosed herein may be employed in the technical field of multicarrier communication systems. More particularly, the embodiments of the technology disclosed herein may relate to signal timing in a multicarrier communication system.

The following Acronyms are used throughout the present disclosure:

| Acronym | Meaning |
| --- | --- |
| ASIC | application-specific integrated circuit |
| BPSK | binary phase shift keying |
| CA | carrier aggregation |
| CSI | channel state information |
| CDMA | code division multiple access |
| CSS | common search space |
| CPLD | complex programmable logic devices |
| CC | component carrier |
| DL | downlink |
| DCI | downlink control information |
| DC | dual connectivity |
| EPC | evolved packet core |
| E-UTRAN | evolved-universal terrestrial radio access network |
| FPGA | field programmable gate arrays |
| FDD | frequency division multiplexing |
| HDL | hardware description languages |
| HARQ | hybrid automatic repeat request |
| IE | information element |
| LTE | long term evolution |
| MCG | master cell group |
| MeNB | master evolved node B |
| MIB | master information block |
| MAC | media access control |
| MAC | media access control |
| MME | mobility management entity |
| NAS | non-access stratum |
| OFDM | orthogonal frequency division multiplexing |
| PDCP | packet data convergence protocol |
| PDU | packet data unit |
| PHY | physical |
| PDCCH | physical downlink control channel |
| PHICH | physical HARQ indicator channel |
| PUCCH | physical uplink control channel |
| PUSCH | physical uplink shared channel |
| PCell | primary cell |
| PCell | primary cell |
| PCC | primary component carrier |
| PSCell | primary secondary cell |
| pTAG | primary timing advance group |
| QAM | quadrature amplitude modulation |
| QPSK | quadrature phase shift keying |
| RBG | Resource Block Groups |
| RLC | radio link control |
| RRC | radio resource control |
| RA | random access |
| RB | resource blocks |
| SCC | secondary component carrier |
| SCell | secondary cell |
| Scell | secondary cells |
| SCG | secondary cell group |
| SeNB | secondary evolved node B |
| sTAGs | secondary timing advance group |
| SDU | service data unit |
| S-GW | serving gateway |
| SRB | signaling radio bearer |
| SC-OFDM | single carrier-OFDM |
| SFN | system frame number |
| SIB | system information block |
| TAI | tracking area identifier |
| TAT | time alignment timer |
| TDD | time division duplexing |
| TDMA | time division multiple access |

| | |
|---|---|
| TA | timing advance |
| TAG | timing advance group |
| TB | transport block |
| UL | uplink |
| UE | user equipment |
| VHDL | VHSIC hardware description language |

Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
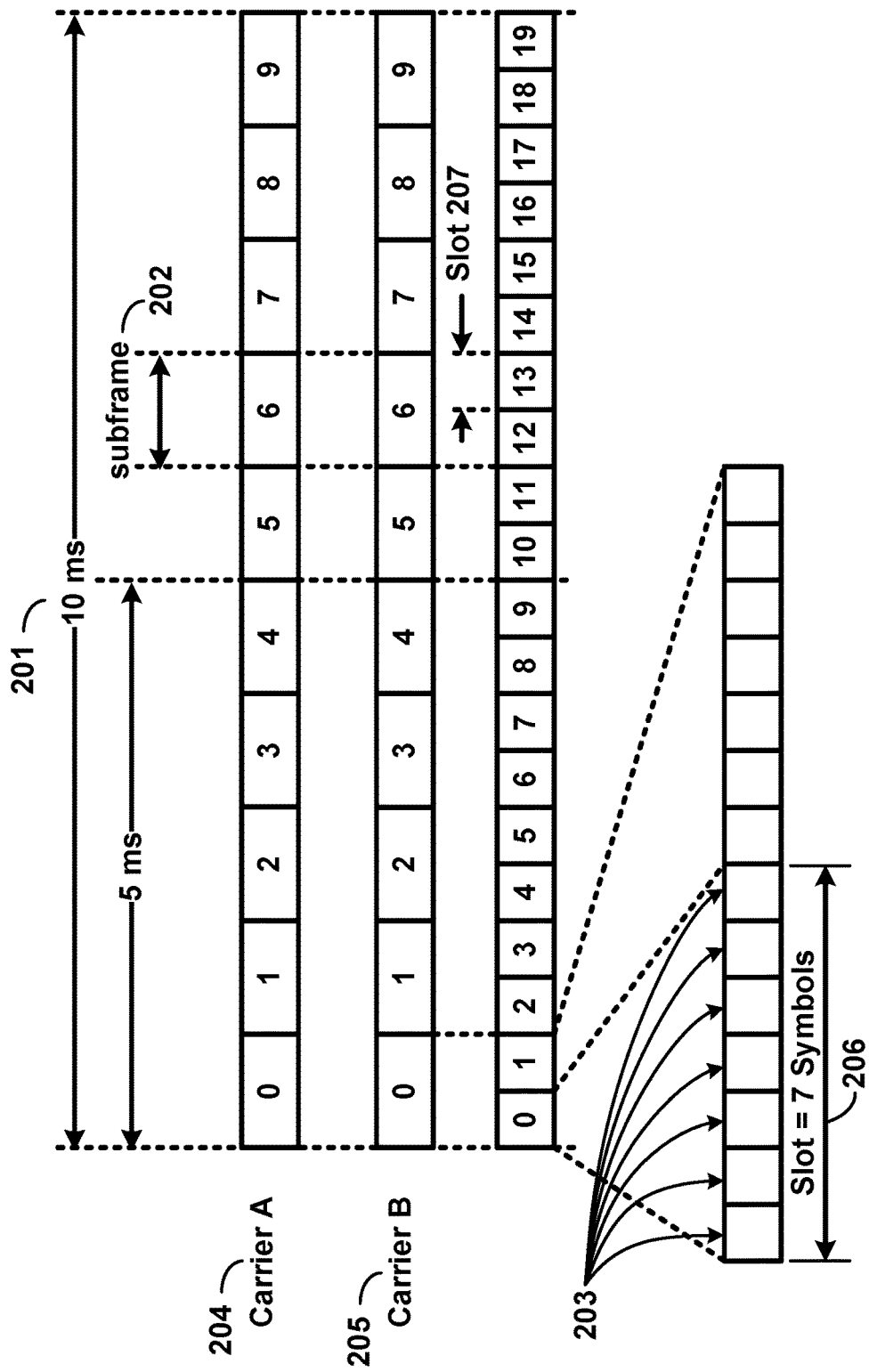
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 msec radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 msec interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
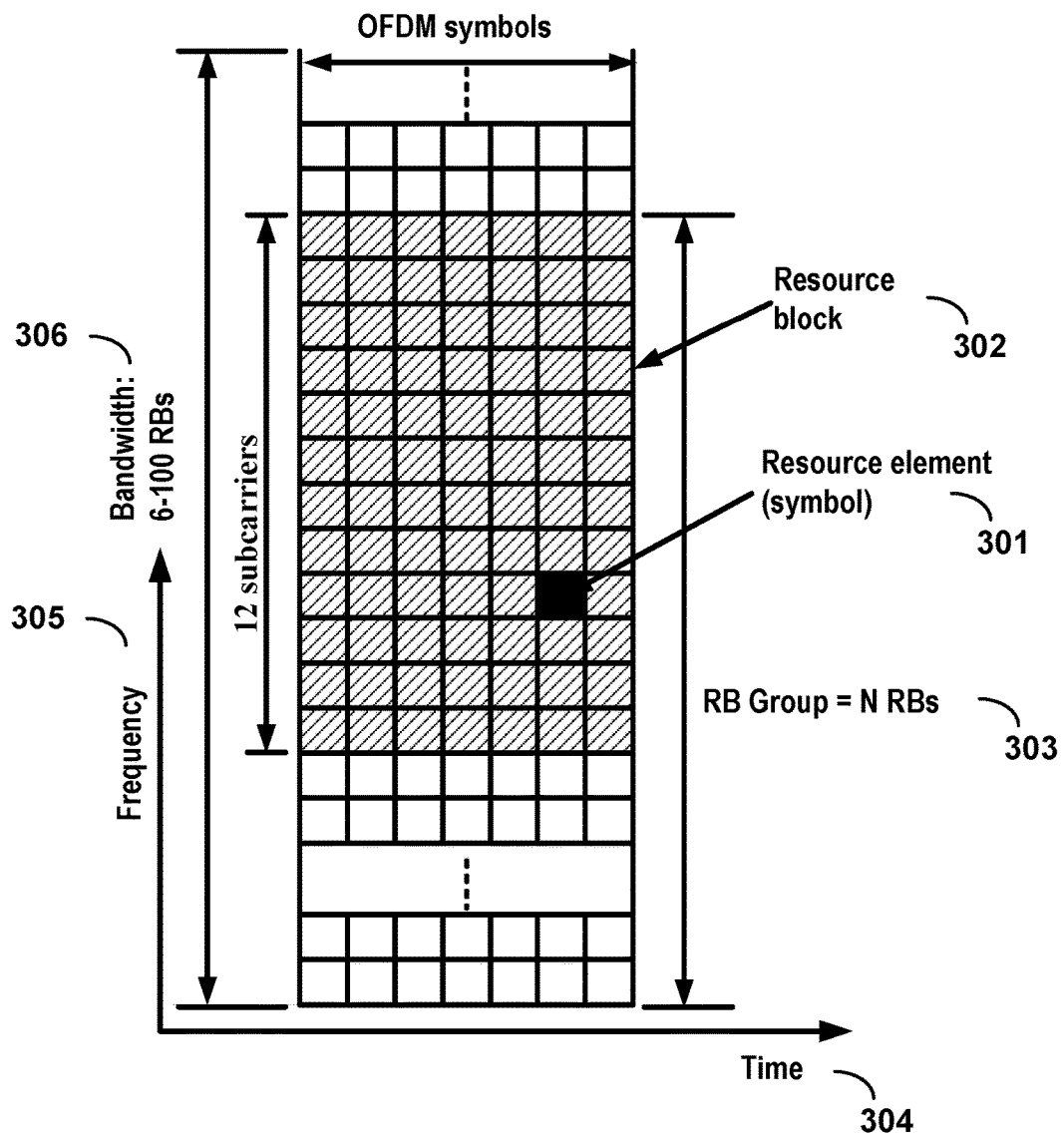
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both transmitter and receiver circuitry. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may include a multitude of base stations, providing a user plane PDCP/RLC/MAC/PHY and control plane (RRC) protocol terminations towards the wireless device. The base station(s) may be interconnected with other base station(s) (e.g. employing an X2 interface). The base stations may also be connected employing, for example, an S1 interface to an EPC. For example, the base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
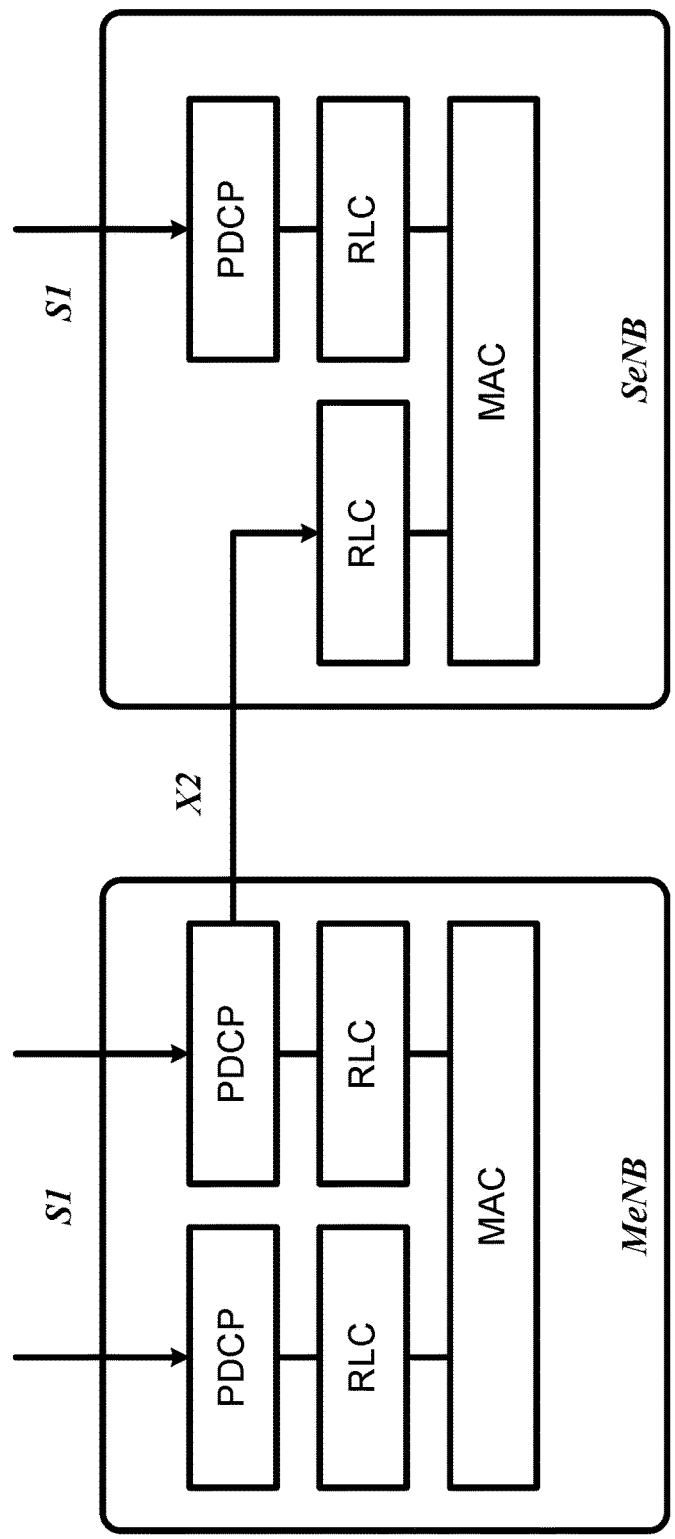
FIG. 6 is an example diagram for a protocol structure with CA and DC as per an aspect of an embodiment of the present invention.
Figure 7:
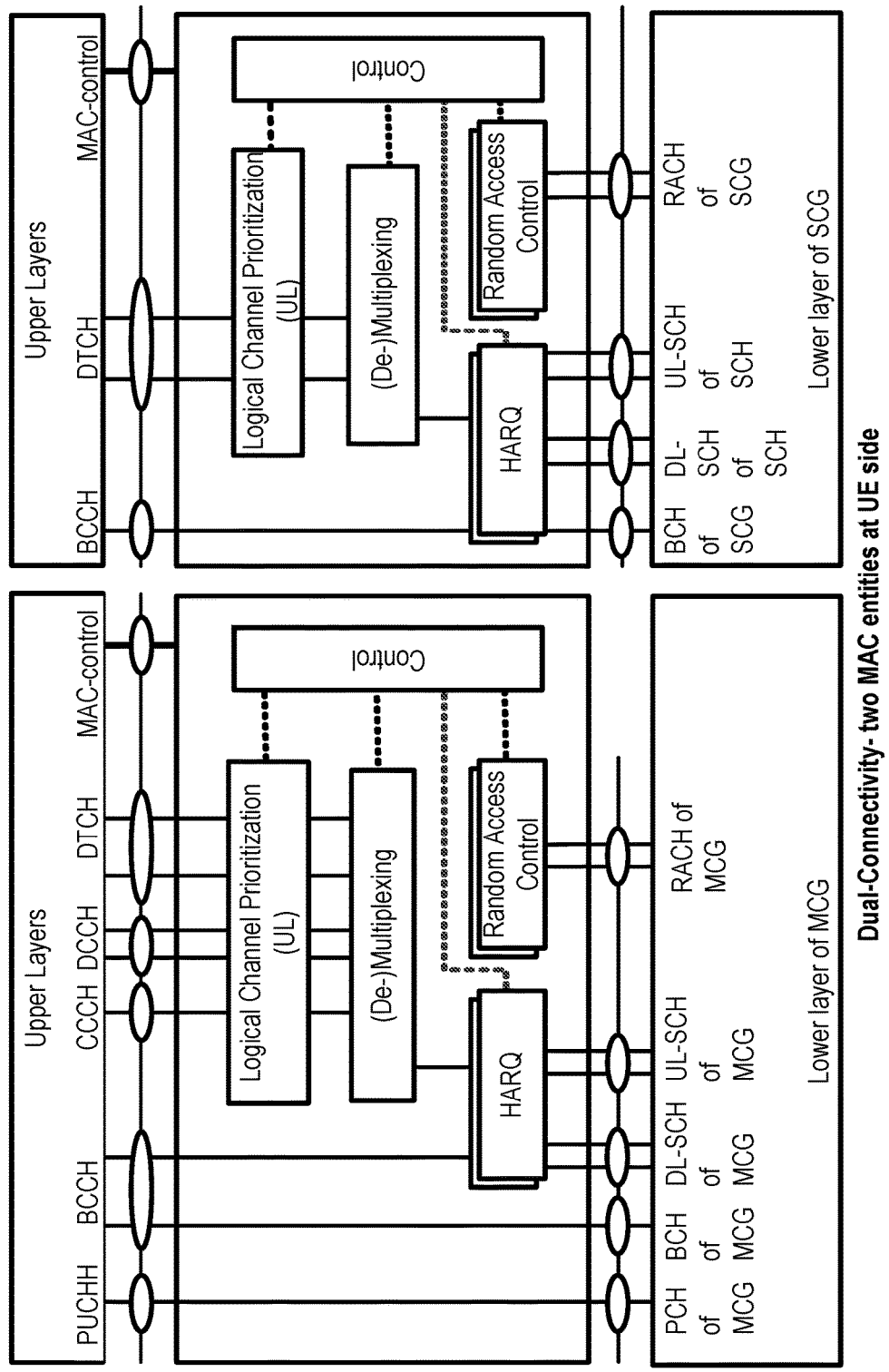
FIG. 7 is an example diagram for a protocol structure with CA and DC as per an aspect of an embodiment of the present invention.

FIG. 6 and FIG. 7 are example diagrams for protocol structure with CA and DC as per an aspect of an embodiment of the present invention. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC, a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the invention.

In the case of DC, the UE may be configured with two MAC entities: one MAC entity for MeNB, and one MAC entity for SeNB. In DC, the configured set of serving cells for a UE may comprise two subsets: a Master Cell Group (MCG) containing the serving cells of the MeNB, and the Secondary Cell Group (SCG) containing the serving cells of the SeNB. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a MeNB may be informed by the UE of a SCG failure type, for split bearer, the DL data transfer over the MeNB is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a MeNB and a SeNB, one or more of the following principles may be applied: the MeNB may maintain the RRM measurement configuration of the UE and may, (e.g., based on received measurement reports or traffic conditions or bearer types), decide to ask a SeNB to provide additional resources (serving cells) for a UE; upon receiving a request from the MeNB, a SeNB may create a container that may result in the configuration of additional serving cells for the UE (or decide that it has no resource available to do so); for UE capability coordination, the MeNB may provide (part of) the AS configuration and the UE capabilities to the SeNB; the MeNB and the SeNB may exchange information about a UE configuration by employing of RRC containers (inter-node messages) carried in X2 messages; the SeNB may initiate a reconfiguration of its existing serving cells (e.g., PUCCH towards the SeNB); the SeNB may decide which cell is the PSCell within the SCG; the MeNB may not change the content of the RRC configuration provided by the SeNB; in the case of a SCG addition and a SCG SCell addition, the MeNB may provide the latest measurement results for the SCG cell(s); both a MeNB and a SeNB may know the SFN and subframe offset of each other by OAM, (e.g., for the purpose of DRX alignment and identification of a measurement gap). In an example, when adding a new SCG SCell, dedicated RRC signalling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

Figure 8:
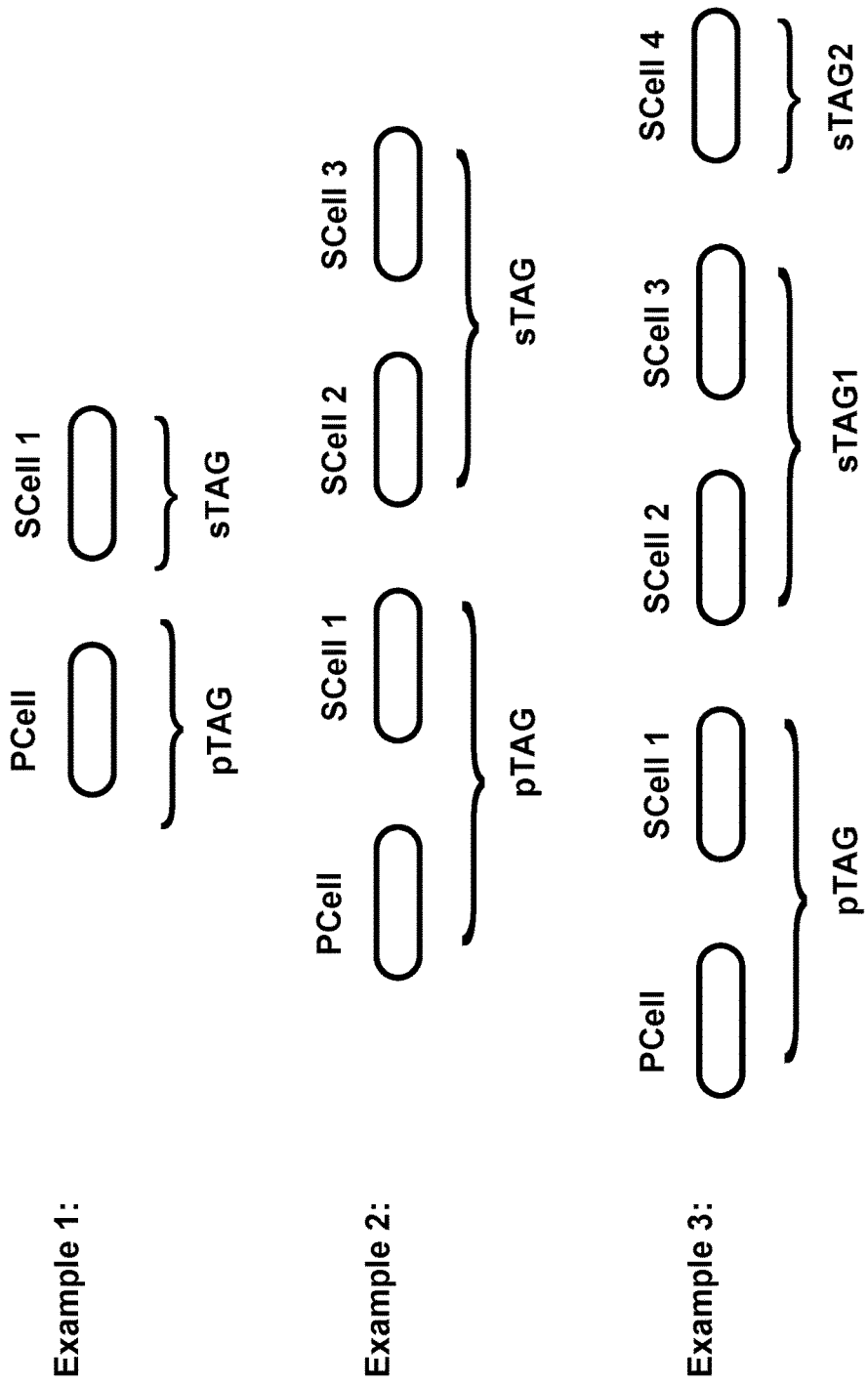
FIG. 8 shows example TAG configurations as per an aspect of an embodiment of the present invention.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
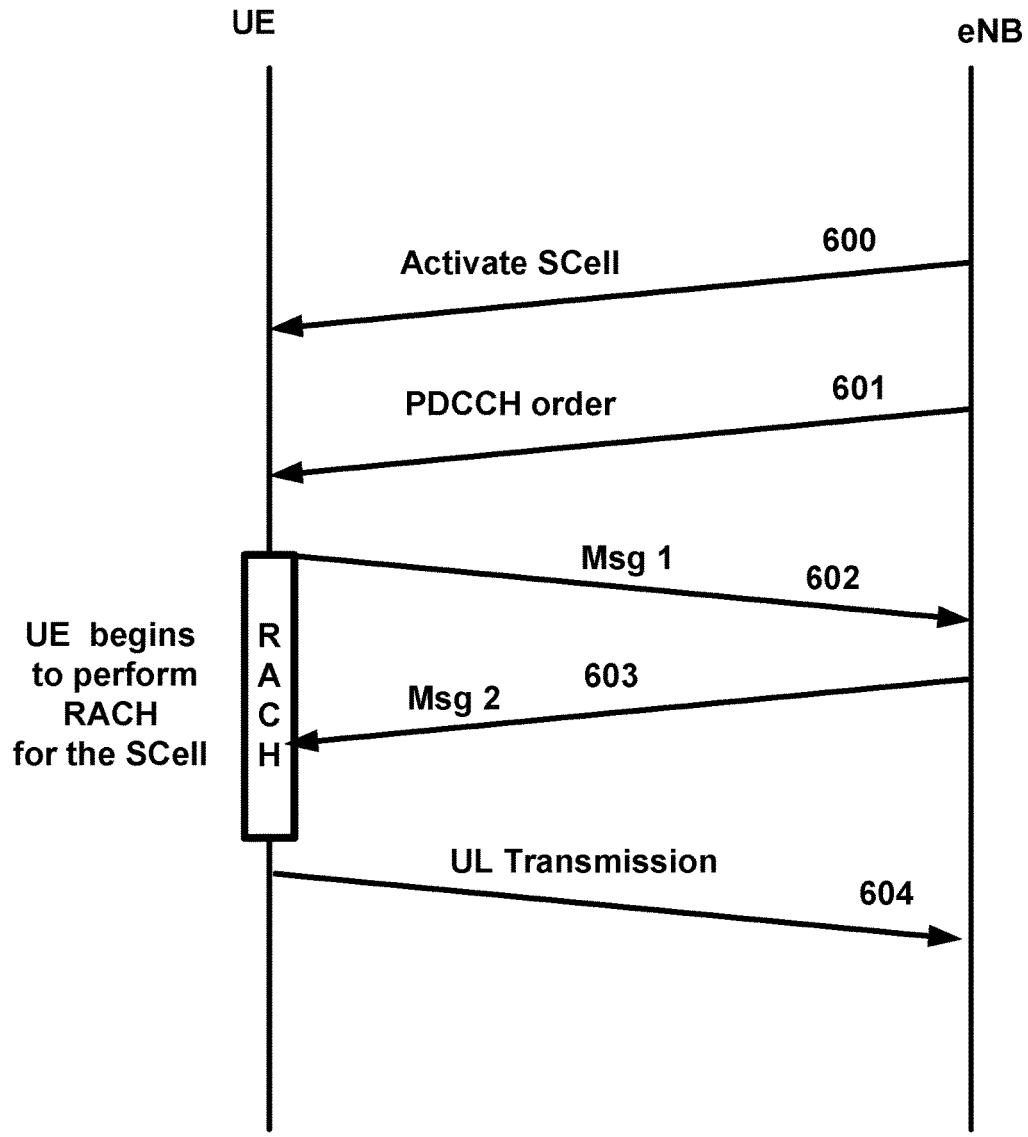
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand Considering user expectations of high data rates along with seamless mobility, it may be beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

A LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

The following signals or combination of the following signals may provide functionality for the UE's time/frequency synchronization for the reception of a DL transmission burst in LAA SCell(s): a) serving cell's DRS for RRM measurement (DRS for RRM measurement may be used at least for coarse time/frequency synchronization), b) reference signals embedded within DL transmission bursts (e.g. CRS and/or DMRS), and/or c) primary/secondary synchronization signals. If there is an additional reference signal, this signal may be used. Reference signals may be used at least for fine time/frequency synchronization. Other candidates (e.g., initial signal, DRS) may be employed for synchronization.

DRS for RRM may also support functionality for demodulation of potential broadcast data multiplexed with DRS transmission. Other mechanism or signals (e.g., initial signal, DRS) for time/frequency synchronization may be needed to support reception of DL transmission burst.

In an example embodiment, DRS may be used at least for coarse time/frequency synchronization. Reference signals (e.g., CRS and/or DMRS) within DL transmission bursts may be used at least for fine time/frequency synchronization. Once the UE detects DRS and achieves coarse time/frequency synchronization based on that, the UE may keep tracking on the synchronization using reference signals embedded in other DL TX bursts and may also use DRS. In an example, a UE may utilize DRS and/or reference signals embedded within a DL transmission burst targeting the UE. In another example, a UE may utilize DRS and/or reference signals embedded within many available DL transmission bursts from the serving cell (to the UE and other UEs).

The discovery signal used for cell discovery/RRM measurement (e.g. opportunistic transmission within configured DMTC) may be used for maintaining at least coarse synchronization with the LAA cell (e.g. <±3 μs timing synchronization error and <±0.1 ppm frequency synchronization error). DRS may be subject to LBT. Inter-DRS latency generally gets worse as Wi-Fi traffic load increases. It is noted that the inter-DRS latency can be rather significant. In example scenario, there may be a probability of approximately 55% that the inter-DRS latency is 40 ms and there may be a probability of approximately 5% that inter-DRS latency is >440 ms. The inter-DRS latency as seen by the UE may be worse considering the possibility of misdetection by the UE. Discovery signal misdetection may be due to actual misdetection or due to UE unavailable for detection because of DRX inter-frequency measurement during DMTC occasion.

Depending on LAA DRS design, OFDM symbol boundary may be obtained by DRS. PCell and SCell timing difference may be kept on the order of ±30 usec. The aggregated cells may be synchronized to some extent, e.g. aligned frame timing and SFN. Thus, similar requirement may be applied to the PCell and LAA cells on the unlicensed band. In an example, a UE may not utilize timing and frequency of the PCell for coarse synchronization of LAA cells since the timing offset may be up to ~30 us (e.g. non-located) and a frequency reference may not be reliable due to the band distance between PCell and LAA cell (2 GHz Pcell and 5 GHz LAA cell). PCell timing information also may be used for time synchronization at subframe or frame level. SCell(s) may employ the same frame number and subframe number as the PCell.

PCell timing information may provide some information for symbol synchronization. By synchronizing PCell, frequency difference observed by UE between PCell and LAA Scell may be up to 0.6 ppm. For example, after 300 ms, the amount of the time drift may be 0.18 usec at most. For LAA, path delay may be relatively small as the target coverage is small. With timing drift, the multi-path delay may be within cyclic prefix length.

According to some of the various aspects of embodiments, a UE may utilize a licensed band carrier as a reference for time/frequency synchronization for CA of licensed carrier and unlicensed carrier, for example when they are in the same group (e.g. co-located). When non-collocated eNBs support licensed band PCell and unlicensed band SCell separately in a CA scenario, there may exist maximum ~30 us timing difference between PCell and unlicensed band SCell. In an example embodiment, the frequency difference between the UE synchronized with PCell and unlicensed band SCell may observe at most 0.6 ppm. An LAA may provide functionality for time/frequency synchronization on unlicensed band at least for non-collocated CA scenario.

Example reasons for a frequency difference may be: 1) oscillator difference among PCell, SCell and UE, 2) Doppler shift and 3) fast fading aspect. The oscillator difference of 0.6 ppm offset in 5 GHz corresponds to 3 kHz offset. Subcarrier spacing of LTE numerology may be 15 kHz. This offset may need to be taken into account before FFT operation. One of the reasons of oscillator frequency variation is temperature. If the frequency difference is not obtained at the point of DRS reception, a UE may need to buffer subsequent data transmission until the UE obtains this frequency difference before FFT. The frequency offset caused by this may be obtained at the reception of DRS. Doppler shift may be small value for a low mobility UE. Fast fading and residual mismatch caused by 1) and 2) may be compensated during a demodulation process similar to a licensed band. This may not require introducing additional reference signals for unlicensed band.

According to some of the various aspects of embodiments, a UE may be configured to perform inter-frequency measurements on the carrier frequency layer using measurement gaps for SCells that are not configured yet. An SCell receiver may not be turned on and measurements may be performed using the Pcell receiver. When a cell is added as an Scell but not activated ("deactivated state"), the UE may receive relevant system information for the SCell from the Pcell. UE may be configured to perform measurements on the Scell without measurement gaps. An SCell receiver may need to be occasionally turned on (e.g. for 5 ms every 160 ms) for RRM measurements using either CRS or Discovery signals. Cells may be added as an Scell and activated ("activated state"), then the UE may be ready to receive PDSCH on the Scell in all subframes. The SCell receiver may perform (E)PDCCH monitoring in every subframe (for a self-scheduling case). An SCell receiver may buffer every subframe for potential PDSCH processing (for both self and cross-carrier scheduling cases).

The eNodeB may configure the UE to measure and report RRM measurements (e.g. including RSSI) on a set of carrier frequencies. Once a suitable carrier or a set of suitable carriers is determined, carrier selected may be added as an SCell by RRC (e.g. with ~15 ms configuration delay), followed by SCell activation (with ~24 ms delay). If an SCell is deactivated, the UE may assume that no signal is transmitted by the LAA cell, except a discovery signal may be transmitted when configured. If an SCell is activated, the UE may be required to monitor PDCCH/EPDCCH and perform CSI measurement/reporting for the activated SCell. In a U-cell, a UE may not assume that every subframe of activated LAA SCell contains transmission. For LAA carriers, channel access may depend on the LBT procedure outcome. The network may configure and activate many carriers for the UE. The scheduler may then dynamically select carrier(s) for DL assignment or UL grant transmission.

According to some of the various aspects of embodiments, the first stage of cell level carrier selection may be during an initial set up of a cell by an eNB. The eNB may scan and sense channels for interference or radar detection. The eNB may configure the SCells accordingly based on the outcome of its carrier selection algorithm for efficient load balancing and interference management. The carrier selection process may be on a different time scale from the LBT/CCA procedure prior to transmissions on the carriers in unlicensed spectrum. The RSSI measurement report from the UE may be used to assist the selection at eNB.

According to some of the various aspects of embodiments, the second stage of cell level carrier selection is after initial set up. The motivation is that an eNB may need to do carrier (re)selection due to static load and interference change on some carriers, e.g., a new Wi-Fi AP is set up and continuously accesses the carrier causing relatively static interference. Therefore, semi-static carrier selection may be based on the eNB sensing of the averaged interference level, potential presence of radar signals if required, and traffic load on the carriers over a relatively longer time scale, as well as RRM measurement from UEs in the cell. Due to the characteristics in unlicensed spectrum, RRM measurements on LAA SCells may be enhanced to support better carrier selection. For example, the RSSI measurement may be enhanced using occupancy metric indicating the percentage of the time when RSSI is above a certain threshold. It may be noted that cell level carrier selection may be a long-term (re)selection since the process may be rather costly due to the signalling overhead and communication interruptions for UEs in a cell and it may also affect the neighboring cells. Once a suitable set of carriers is identified, they may be configured and activated as SCells for UEs. This process may be continuous in order to keep reassessing the interference environment. Cell-level carrier selection in unlicensed spectrum may be a relatively long-term (re)selection based on eNB sensing and RRM measurement report from UE. RRM measurement on LAA SCells may be enhanced to support better carrier selection.

Carrier selection from a UE perspective may be to support carrier selection for a UE among the set of carriers that the eNB has selected at the cell level. Carrier selection for the UE in unlicensed spectrum may be achieved by configuring a set of the carriers on which the UE supports simultaneous reception and transmission. The UE may perform RRM measurements on the configured carriers and report them to the eNB. The eNB may then choose which of the carriers to activate and use for transmission when it has pending data for the UE. The number of carriers to activate may then also be chosen based on the data rate needed and the RRM measurements for the different carriers. The activation delay for a carrier before scheduling data on it may be up to ~24 ms, assuming that the UE has performed RRM measurement on this carrier prior to receiving the activation command within DRX cycle. By operating the carrier selection based on activation and deactivation, the selection may also be done in the order of tens of msec.

According to some of the various aspects of embodiments, CRS may not be transmitted in an activated subframe when a burst is not scheduled in that subframe. If there are no transmissions from the eNB for an extended duration (Toff), UE demodulation performance may be impacted due to lack of reference symbols for fine time/frequency tracking. The extent of performance impact may depend on the amount of time for which there are no eNB transmissions. The impact may be mitigated by more frequent transmission of discovery signals.

Discovery signals may be transmitted by the eNB even when UEs are not being scheduled. Setting discovery signal periodicity based on UE RRM measurement requirements (e.g. 160 ms) may be more efficient than setting the periodicity based on UE fine time/frequency tracking requirement.

In an example embodiment, Scell deactivation timer for the unlicensed Scell may be set to a value closer to (Toff) based on UE fine time/frequency tracking requirements. This may result in more frequent transmission of activation commands Activation commands may be needed when the eNB has data to schedule to a UE. From the UE perspective, after receiving an activation command in a particular subframe, the UE may receive CRS in a number (e.g. one or two) of the following subframes. The UEs may receive CRS transmissions for a few symbols or subframes, which they may use for settling AGC loop and time-frequency tracking filters before PDSCH reception on the SCell. UEs may receive CRS transmission (e.g. in a few OFDM symbols) between reception of activation command and reception PDSCH on the Scell.

Activating a large number of carriers on dynamic bases may increase the UE power consumption, false alarm probability, and processing power requirements Improved mechanisms are needed to improve efficiency in the UE and enable fast and dynamic carrier selection/activation in a UE. Novel mechanisms may reduce UE power consumption, reduce false alarm probability and reduce processing power requirements. Carrier selection and activation may be enhanced to achieve fast dynamic carrier selection (or switching). A fast activation procedure for the carrier (e.g. shorter than the currently defined 24 ms) may be defined to improve efficiency.

Current SCell activation latency may include the MAC CE decoding latency (~3-6 ms) and SCell activation preparation time (RF preparation, up to ~18 ms) Implementation of faster processes and hardware may reduce these delays. SCell MAC activation/deactivation signalling may be UE-specific. Signalling overhead may be a concern especially if the cell used for transmitting the signal is a macro cell. In an example embodiment, a L1 procedure/indicator may be introduced and/or SCell activation signalling may be enhanced.

Layer one signalling (e.g. PDCCH/EPDCCH from the PCell or another serving cell) may be implemented to signal the set of carriers that the UE may monitor for PDCCH/EPDCCH and/or measuring/reporting CSI. Control signalling latency may be ~2 ms (e.g. one 1 ms EPDCCH transmission plus 0.5 ms decoding). The DCI format may be of small size for transmission reliability and overhead reduction. To reduce control signalling overhead, the signalling may be a UE-common signalling. The indication may be sent on a carrier that the UE is currently monitoring.

In an example embodiment, a mechanism based on a L1 indication for starting/stopping monitoring of up to k activated carriers may be provided. The UE may be configured with n>=k CCs. k CCs may be activated via MAC signalling of SCell activation/deactivation. Based on LBT progress over the CCs, a L1 indication may be sent to inform which of the k CCs may be monitored by the UE and which may not. The UE may then receive data burst(s) on the monitored CCs. Another L1 indication may be sent after the bursts to alter which CCs may be monitored since then, and so on. The L1 indication may be explicit (e.g., based on a signalling) or implicit (e.g., based on self-scheduling and UE detection of scheduling information on the SCell). For this example, fast carrier switching is done among at most k CCs.

In an example embodiment, a mechanism based on a L1 signalling for starting/stopping monitoring of up to m activated carriers (the number of p configured carriers may be m or higher). The activated carriers may be more than n (e.g., there may be more CCs activated for the UE than its PDSCH aggregation capability-n). The UE is configured with p CCs, and there may be up to m CCs that are activated via MAC signalling of SCell activation/deactivation. The UE may not monitor all the activated CCs. The UE may monitor at most n CCs according a L1 indication. The L1 indication needs to be explicit rather than implicit, since an implicit indication may require a UE to monitor all the up to m activated carriers at the same time, exceeding the UE's capability. For this example, fast carrier switching is done among possibly more than n CCs.

According to some of the various aspects of embodiments, SCell activation/deactivation enhancements may be considered for fast carrier switching. SCell activation/deactivation signalling is a MAC signalling. MAC signalling decoding/detection (with or without enhancements) may be slower than L1 signalling decoding/detection. It may involve decoding/detection of a L1 signalling and furthermore, a PDSCH. If SCell activation/deactivation is carried by a L1 signalling, it may still be considered for fast carrier switching. In an example embodiment, a mechanism based on a L1 signalling for activation/deactivation of the p configured carriers. The UE is configured with p CCs, but each time there are at most n CCs are activated via a L1 signalling of SCell activation/deactivation. For instance, based on LBT progress over the CCs, a L1 signalling may be sent to inform which of the p CCs are activated. The UE may receive data burst(s) on the activated CCs. Another L1 signalling may be sent after the bursts to alter the activated CCs. For this example, fast carrier switching may be done among possibly more than n CCs.

The control signalling may be transmitted before the eNB has gained access to the carrier via LBT process. An eNB may inform the UE to start (or stop) monitoring a carrier (whether the UE would receive a burst or not depends on the presence of PDCCH scheduling information for the carrier). An indication for starting monitoring may be used for more than one burst, until an indication for stopping monitoring is sent. The indication may be sent when the eNB expects the (E) CCA is to complete soon. A purpose of the indication may be to inform a UE to start or stop monitoring a carrier.

Transmitting the control signalling after the eNB has gained access to the carrier may incur overhead of the reservation signal (proportional to the control signalling latency). In an example, the maximum transmission burst may be 4 ms. An eNB may inform the UE to receive a burst on a carrier. The eNB may send one indication for a burst. There may be many short bursts (e.g., one burst may last up to 4 milliseconds in certain regions). The indication may be sent after (E)CCA is completed, consuming some portion of the maximum allowed transmission duration for a burst.

It may still be up to the network to transmit the control signalling before or after the channel is occupied. A UE may detect that the burst is from the serving cell (e.g. by confirming PCID). A function of the control signalling may be to indicate that the UE may perform DL transmission burst detection of the serving cell. If a DL burst of the serving cell is detected, the UE may monitor for possible PDCCH/EPDCCH and/or measuring the CSI on the indicated SCell.

In an example embodiment, a UE may be configured with a number of carriers potentially exceeding the maximum number of carriers over which the UE may aggregate PDSCH. RRM measurements over the configured carriers may be supported, e.g. RSSI-like measurement, extension of quasi co-location concept to across collocated intra-band carriers, and/or carrier grouping. L1 indication to the UE to start monitoring a carrier, which is selected from the configured carriers by the eNB may be supported.

According to some of the various aspects of embodiments, an eNB may configure a UE with more component carriers which may potentially exceed the maximum number of carriers over which the UE may aggregate PDSCH. eNB may activate one or more carriers among the configured carriers to the UE by the existing signalling, e.g. MAC signalling. The UE may be scheduled on the one or more activated carriers dynamically based on the LBT mechanism.

A UE may switch to receive on any carrier within a set of carriers selected by the serving eNB as fast as subframe/symbol-level, while the number of carriers within the set may potentially exceed the maximum number of carriers over which the UE may aggregate PDSCH. Which carrier(s) the UE may switch to is per eNB indication. When the UE is indicated with the carrier(s) it may switch to, the UE may start to monitor the indicated carrier(s), e.g. within a few subframes, and may stop monitoring other carriers. By monitoring a carrier, it meant to buffer and attempt to detect the control channels and other associated channels. The eNB indication may instruct the UE to switch to the indicated carrier(s) and monitor the carrier(s). The eNB may not instruct the UE to switch to monitor on more carriers than its PDSCH aggregation capability in a given subframe. The eNB may not schedule the UE on more carriers than its PDSCH aggregation capability. SCell configuration enhancements may allow both semi-static and fast carrier switching with reduced transition time. The delay associated with the SCell configuration signalling as well as the delay associated with the measurement process may be decreased.

In an example embodiment, fast carrier switching may support a UE to switch to any carrier within a set of carriers selected by the serving eNB as fast as a few subframes/symbols. The eNB may send an indication instructing the UE to switch to the indicated carriers and monitor the carriers. Then the UE may perform the switching and start monitoring the indicated carriers. The UE stops monitoring other carriers. The eNB indication may be done in L1. A L1 procedure/indicator, or an enhancement of the SCell activation signalling may be introduced.

According to some of the various aspects of embodiments, DRS design may allow DRS transmission on an LAA SCell to be subject to LBT. The transmission of DRS within a DMTC window if LBT is applied to DRS may consider many factors. Subjected to LBT, DRS may transmitted in fixed time position within the configured DMTC. Subject to LBT, DRS may be transmitted in at least one of different time positions within the configured DMTC. The number of different time positions may be restricted. One possibility is one-time position in the subframe. DRS transmissions outside of the configured DMTC may be supported.

According to some of the various aspects of embodiments, a sensing interval may allow the start of a DL transmission burst (which may not start with the DRS) containing DRS without PDSCH within the DMTC. Total sensing period may be greater than one sensing interval. Whether the above may be used for the case where transmission burst may not contain PDSCH but contains DRS, and any other reference signals or channels. The ECCA counter used for LBT category 4 for the PDSCH may be frozen during DL transmission burst containing DRS without PDSCH The RS bandwidth and density/pattern of the DRS design for LAA may support for RRM measurement based on a single DRS occasion.

According to some of the various aspects of embodiments, Discovery signal may be transmitted via a successful LBT operation. When the eNB does not have access to the channel, the discovery signal burst may not be transmitted. In an example, the discovery signal periodicity is configured to be 40 ms, and it may be possible to receive the discovery signal at least once in every 160 to 200 ms with a high probability. For example, the probability of receiving a discovery signal burst at least once in every 160 ms may greater than 97%. The UE may adjust its receiver processing to account for the potential absence of discovery signals due to lack of access to the channel. For instance, the UE may detect the presence or absence of a particular discovery signal burst using the PSS, SSS and CRS signals.

According to some of the various aspects of embodiments, the use of discovery signals that may be subject to LBT. A discovery signal burst may not be transmitted when LBT fails. Data may be transmitted in the intervening subframes. The reference signals along with control information may be used to reserve the channel prior to a discovery signal or data transmission.

For reception of data on the serving cell, AGC and fine time and frequency estimation may employ the discovery signals from the serving cell. In an example, time and frequency estimation may be performed using the PSS, SSS and/or CRS inside the discovery signal subframes. The use of two or more CRS ports may enhance synchronization performance. These signals may provide synchronization estimates that are adequate for the purpose of RRM measurements on the serving and neighboring cells. When data is to be received by the UE in a subframe that occurs a significant number of subframes after the last reception of a discovery signal on the serving cell. Fine tuning of the time and frequency estimates may be performed using the DM-RS and, if present, the CRS within the subframe in which data is received, and/or the initial signal. The signal used to reserve the channel before the actual start of data transmissions (e.g. reservation signal, initial signal, and/or burst indicator) may be used to fine tune time and frequency estimates before the reception of data. When transmitting data after a long absence of any discovery signal or other transmissions, the eNB may transmit a signal of longer duration to reserve the channel in order to facilitate the use of such a signal for timing and frequency adjustments.

According to the latest release of 3GPP standards (e.g. 3GPP TS 36.300, 3GPP TS 36.331, 3GPP TS 36.321) each TAG must contain at least one serving cell with a configured uplink. Each configured cell must be included in the primary TAG or a secondary TAG. The parameter sTAG-Id in MAC-MainConfigSCell configured for an SCell indicates the TAG of an SCell. The parameter sTAG-Id uniquely identifies the TAG within the scope of a Cell Group (e.g. MCG or SCG). If the field is not configured for an SCell (e.g. absent in MAC-MainConfigSCell), the SCell is part of the pTAG.

According to the latest release of 3GPP TS 36.300, in RRC_CONNECTED, the eNB is responsible for maintaining the timing advance. Serving cells having UL to which the same timing advance applies (typically corresponding to the serving cells hosted by the same receiver) and using the same timing reference cell are grouped in a timing advance group (TAG). Each TAG contains at least one serving cell with configured uplink, and the mapping of each serving cell to a TAG is configured by RRC. In case of DC, a TAG only includes cells that are associated to the same eNB and the maximum number of TAG is 8. In some cases (e.g. during DRX), the timing advance is not necessarily always maintained and the MAC sublayer knows if the L1 is synchronized and which procedure to use to start transmitting in the uplink: as long as the L1 is non-synchronized, uplink transmission may only take place on PRACH.

For a TAG, cases where the UL synchronization status moves from "synchronized" to "non-synchronized" include: Expiration of a timer specific to the TAG; Non-synchronized handover.

The synchronization status of the UE follows the synchronization status of the pTAG of MCG. The synchronization status of the UE w.r.t. SCG follows the synchronization status of the pTAG of SCG. When the timer associated with pTAG is not running, the timer associated with a sTAG in that CG may not be running Expiry of the timers associated with one CG does not affect the operation of the other CG.

The value of the timer associated to the pTAG of MCG is either UE specific and managed through dedicated signalling between the UE and the eNB, or cell specific and indicated via broadcast information. In both cases, the timer is normally restarted whenever a new timing advance is given by the eNB for the pTAG: restarted to a UE specific value if any; or restarted to a cell specific value otherwise.

The value of the timer associated to a pTAG of SCG and the value of a timer associated to a sTAG of a MCG or a sTAG of SCG are managed through dedicated signalling between the UE and the eNB, and the timers associated to these TAGs may be configured with different values. The timers of these TAGs may be restarted whenever a new timing advance is given by the eNB for the corresponding TAG.

Upon DL data arrival or for positioning purpose, a dedicated signature on PRACH may be allocated by the eNB to the UE. When a dedicated signature on PRACH is allocated, the UE may perform the corresponding random access procedure regardless of its L1 synchronization status.

Timing advance updates are signalled by the eNB to the UE in MAC PDUs.

The UE may have capability to follow the frame timing change of the connected eNode B. The uplink frame transmission takes place ($N_{TA}$ $N_{TA\ offset}$)×$T_s$ before the reception of the first detected path (in time) of the corresponding downlink frame from the reference cell. The UE may be configured with a pTAG containing the PCell. The pTAG may also contain one or two SCells, if configured. The UE capable of supporting multiple timing advance may also be configured with one sTAG, in which case the pTAG may contain the PCell and the sTAG may contain one or more SCells. The UE capable of supporting dual connectivity may be configured with one pTAG and may also be configured with one psTAG. The pTAG may contain the PCell and the psTAG may contain the PSCell.

3GPP TR 36.889 V13.0 (2015-06) is a Technical Report published by 3rd Generation Partnership Project, in Technical Specification Group Radio Access Network. 3GPP TR 36.889 is entitled "Study on Licensed-Assisted Access to Unlicensed Spectrum" and is a technical report for Release 13 of LTE-Advanced technology. The purpose of the TR is to document the identified LTE enhancements and corresponding evaluations for a single global solution framework for licensed-assisted access to unlicensed spectrum.

The Rel-13 Work Item on Licensed-Assisted Access to Unlicensed Spectrum (LAA) has been approved in RAN#68, 3GPP document RP-151045 in June 2015, to "only specify support for LAA SCells operating with only DL transmissions." Uplink transmission capabilities may be added to later releases, e.g., Rel-14.

In some example embodiments, TAG mechanisms are described when LAA (unlicensed) SCells with DL only transmission are configured. In some example embodiments, TAG mechanisms are described when LAA-SCells with both DL and UL transmission are configured. The synchronization issues for LAA cells are addressed and example mechanisms for enhancing synchronization in a multi carrier configuration are presented.

According to the latest LTE-Advanced standard specification, each TAG contains at least one serving cell with configured uplink, and the mapping of each serving cell to a TAG is configured by RRC. Each configured cell must be included in the primary TAG or a secondary TAG. The parameter sTAG-Id in MAC-MainConfigSCell configured for an SCell indicates the TAG of an SCell. If the field is not configured for an SCell (e.g. absent in MAC-MainConfigSCell), the SCell is part of the pTAG.

LTE-A Rel-13 may specify support for LAA SCells operating with only DL transmissions. The cells with no configured uplink may not have a timing advance. There is no uplink transmission for SCell(s) with no configured uplink. According to the current principles, LAA cells with no configured uplink may be assigned to a TAG that includes at least one other cell with a configured uplink. In an example embodiment, LAA cells may not be configured with mac-MainConfigSCell, and as a result may be considered belonging to a pTAG. Since pCell is always configured with an uplink, pTAG containing LAA cells (without uplink) contain a cell (pCell) with configured uplink. Some example embodiments provide methods and systems for TAG configuration of DL only LAA cells. Some example embodiments provide methods and systems to enhance synchronization for DL only LAA cells. Some example embodiments provide methods and systems to enhance uplink transmission timing of unlicensed (e.g. LAA) cells. Example embodiments of the invention enhances synchronization of downlink and/or uplink signals when LAA cells are configured as a part of pTAG and/or sTAG.

In an example embodiment, LAA cell(s) may transmit signals from a transmission point located at a different location compared with the primary cell. The subframe reception timing of LAA cell and pCell may be different, e.g. due to propagation delay, and/or synchronization errors between two different transmission points. If mac-MainConfigSCell is not configured for a LAA cell, the cell may be configured as a part of the pTAG, even though downlink reception timing of pCell may not be synchronized with downlink reception timing of the LAA cell in a UE receiving signals from both cells. That may not be an issue when synchronization (e.g. fine synchronization) of received signals from SCell and pCell are done separately in a UE receiver.

In a scenario, wherein multiple LAA cells are configured on a transmission point different from the pCell, configuration of those LAA cells as a part of the pCell may result in non-optimal configurations. For example, multiple DL-only LAA cells may be transmitted from a given transmission point and have the same downlink timing difference. The downlink timing of these DL-only cells may be different from the timing of a pCell transmitted from a different transmission point. In such a scenario, synchronization at symbol level (e.g. fine synchronization) for LAA cells may not be based on the signals received from the pCell.

Synchronization of signals received from an LAA cell may be more difficult compared with synchronization of signals received on a licensed cell. For example, synchronization and reference signal transmission by an eNB on an LAA cell is subject to LBT. For example, an eNB may not be able to transmit synchronization signals in many instances on a congested and/or interfered cell.

In an example embodiment, LAA cells transmitted from the same transmission point may be synchronized. A UE may receive signals of these LAA cells with the same timing. For example, one or more instance of synchronization signals and/or reference signals received on one of the LAA cells may be used for synchronizing one or more LAA cells transmitted from the same transmission point. This mechanism in a UE may provide many advantages in synchronizing to an LAA cell when multiple LAA cells are configured on the same transmission point. The cells from the same transmission point may be in the same band. Signals of cells in the same band and the same transmission point may be synchronized to each other and received via the same transceiver.

In an example embodiment, DL only LAA cells may be configured as a part of the pTAG or sTAG. The parameter sTAG-Id in MAC-MainConfigSCell may be configured for a DL-only SCell and indicate the TAG of the DL-only LAA SCell. DL only LAA cells do not transmit uplink signals. In an example, TAG configuration may be employed for enhancing downlink synchronization for LAA cell(s). In an example, a TAG may not necessarily include a cell with a configured uplink. The latest release of LTE-Advanced specification teaches away from such a configuration. In an example scenario, such a configuration may enhance downlink synchronization in LAA cells.

A wireless device may receive at least one (RRC) message comprising configuration parameters of a plurality of cells grouped into a plurality of cell groups comprising a first cell group and a second cell group. The plurality of cells consisting of: a plurality of downlink-uplink cells, each of the plurality of downlink-uplink cells having a configured uplink and a configured downlink; and at least one downlink-only cell, each of the at least one downlink-only cell having a configured downlink with no configured uplink. The wireless device may receive at least one timing advance command comprising: a time adjustment value and an index of the first cell group. The wireless device may apply the timing advance command to uplink transmission timing of at least one downlink-uplink cell in the first cell group.

In an example, the second cell group may be configurable to consist of one or more downlink-only cells only if the one or more downlink-only cells are unlicensed cells. In an example, the second cell group may be configurable to consist of one or more downlink-only cells only if the wireless device has a first capability, for example support LAA cells, supports LAA cells with certain configuration, is compatible with a certain LTE release, and/or support enhanced configuration, and/or the like.

If the one or more downlink-only cells are licensed cells, the second cell group may comprise one or more downlink-uplink cells in the plurality of downlink-uplink cells. The first cell group may comprise a first subset of the plurality of cells. Uplink transmission timing in the first cell group being derived employing a first cell in the first cell group. In an example, time alignment timer of the second cell group may be disabled/released or set to infinity when the second cell group consists of the one or more downlink-only cells. In an example, time alignment timer may not be configured for the second cell group when the second cell group consists of the one or more downlink-only cells.

In an example embodiment, the second cell group may be configurable to consist of one or more downlink-only cells only if the wireless device has a first capability. For example, if the wireless device supports unlicensed cells, or certain configuration of unlicensed cells. In an example, the wireless device includes a certain IE in the capability message transmitted to the base station indicating support for such feature, for example, when the wireless device supports a new carrier type or an enhanced carrier configuration. For example, if the wireless device is a release 13/14/15, and/or beyond wireless device. If the wireless device does not have a first capability, the second cell group may comprise one or more downlink-uplink cells in the plurality of downlink-uplink cells. If the wireless device does not have a first capability, the legacy TAG rules on cell configurations in a group may apply. When a cell is de-activated, synchronization is needed to decode DRS signal, when DRS is configured. When a cell is de-activated, synchronization is needed to decode synchronization, CRS, and/or CSI-RS signals (e.g. for RRM measurement), if DRS is not configured. If broadcast data is received along with DRS, DRS signal may be used to fine synchronize the receiver to decode the downlink broadcast data. Fine synchronization is needed to decode downlink bursts (when a cell is activated). Example embodiments may be implemented when a cell is deactivated, to enhance synchronization to decode received signals, e.g., DRS signals. Example embodiments may be implemented when a cell is activated, to enhance synchronization to decode DRS signals, CSI-RS and/or downlink bursts.

In an example embodiment, a type of grouping may be introduced to support downlink synchronization for unlicensed cells. For example, unlicensed cells transmitted from the same transmission point and/or from the transmitted in the same band may be grouped in a group. An RRC message may comprise one or more parameters indicating the downlink grouping of unlicensed cells. For example, an identifier such as a group index, a reference cell index, a band index, or a transmission point index may be introduced to identify the group. Cells in the group may perform downlink synchronization jointly to enhance downlink synchronization. In an example, embodiment the TAG grouping may be employed for downlink synchronization in a group.

Figure 13:
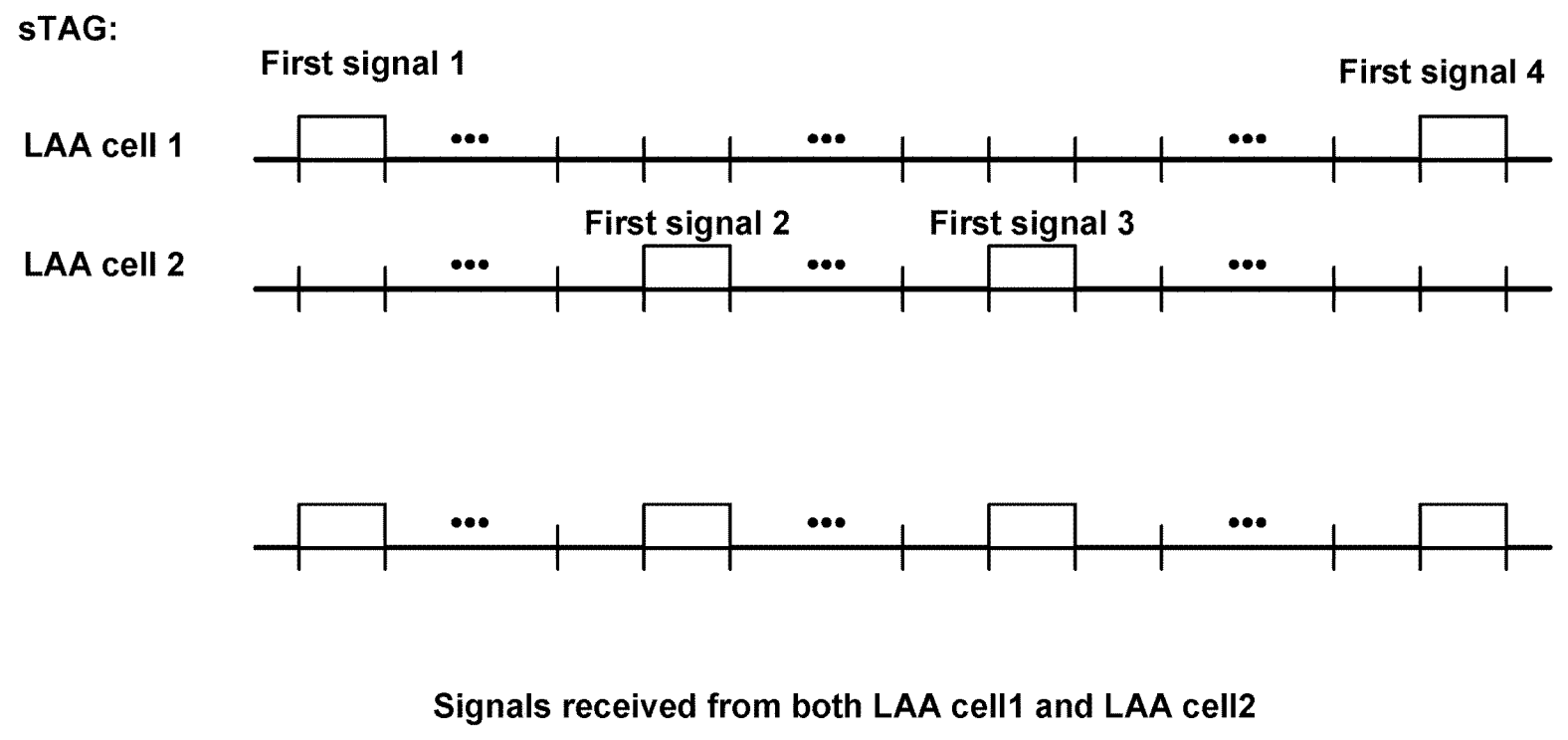

The wireless device may receive at least one control message comprising configuration parameters of a plurality of cells comprising two or more unlicensed cells comprising a first unlicensed cell and a second unlicensed cell. The wireless device may synchronize a reception timing of the first unlicensed cell employing at least a second received signal of the second unlicensed cell. The wireless device may synchronize a reception timing of the second unlicensed cell employing at least a first received signal of the first unlicensed licensed cell. A plurality of cells may be grouped. Downlink synchronization of the cells in the group may be performed employing signals of more than one of cells in the group. An example process is illustrated in FIG. 13. Synchronization signal, discovery signal and/or reference signal of more one cell may be employed for synchronization of downlink signals of a cell. The synchronization may be at the symbol level (e.g. fine downlink synchronization and/or coarse synchronization level).

In an example embodiment, downlink synchronization of an LAA cell may employ downlink signals of a licensed cell transmitted from the same transmission point and configured in the same TAG (or another type of group). In an example embodiment, downlink synchronization of an LAA cell may employ downlink signals of another LAA cell transmitted from the same transmission point configured in the same group.

In an example embodiment, a TAG may or may not include a cell with a configured uplink. For example, DL only LAA cells transmitted from the same transmission point may be configured in a TAG without a cell with a configured uplink. In an example embodiment, a DL only cell and a DL only LAA cell transmitted from the same transmission point may be configured in a TAG without a cell with a configured uplink. Such mechanisms may enhance downlink synchronization in a multi carrier configuration, e.g. when LAA cell(s) are configured. For example, the LAA cell may employ the signals received on the licensed cell (e.g. in addition to received signals on the LAA cell) to enhance downlink synchronization.

Enhancing TAG configuration to support/enhance downlink synchronization and improve uplink synchronization may improve synchronization mechanisms in a multi-carrier technology. Some example embodiments enhance the TAG configuration and processes/mechanisms.

In some example embodiments, a different type of grouping may be introduced for improving downlink synchronization. The processes introduced for enhancing TAG configuration may be implemented in a different type of grouping. In some example implementations, a cell group is called a TAG. Other naming conventions may be used instead of a TAG, such as a synchronization group, a downlink synchronization group, a cell group, a timing group, and/or the like.

Figure 10:
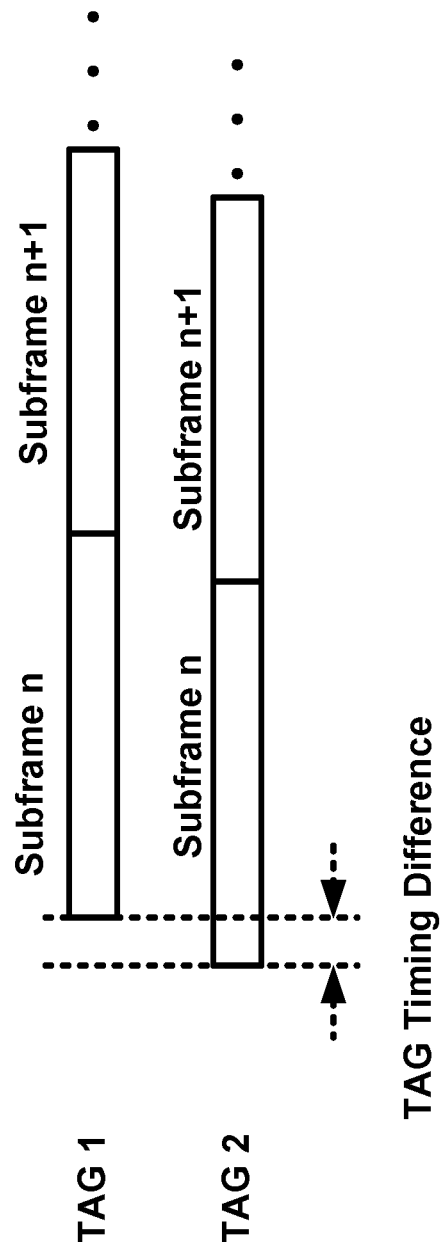
FIG. 10 is an example diagram depicting downlink reception timing of one or more cells in TAG1 and TAG2 as per an aspect of an embodiment of the present invention.

FIG. 10 is a diagram depicting downlink reception timing of one or more cells in a first timing advance group (TAG1) and a second TAG (TAG2) as per an aspect of an embodiment of the present invention. TAG1 may include one or more cells, TAG2 may also include one or more cells. The TAG timing difference in FIG. 10 may be the difference in UE downlink reception timing for downlink carriers in TAG1 and TAG2. The timing difference may range between, for example, sub micro-seconds to about 30 micro-seconds. Cells in TAG2 may use the same frame and subframe numbers of the cells in TAG1. Cells in TAG2 may use the same frame and subframe numbers of the pCell. Signals received in TAG1 and TAG2 are not synchronized at OFDM symbol boundaries. Received signals of TAG1 may not be employed for determining OFDM symbol boundaries of signals at TAG2.

FIG. 10 shows two different TAGs with two different downlink reception timings. In an example embodiment, a different type of grouping may be configured. For example, a downlink grouping may be configured wherein cells with the same downlink timing are grouped in the same group. Instead of TAG1 and TAG2, a downlink group 1 and downlink group 2 may be configured, and cells in each downlink group may have a common synchronization process/mechanism.

Figure 11:
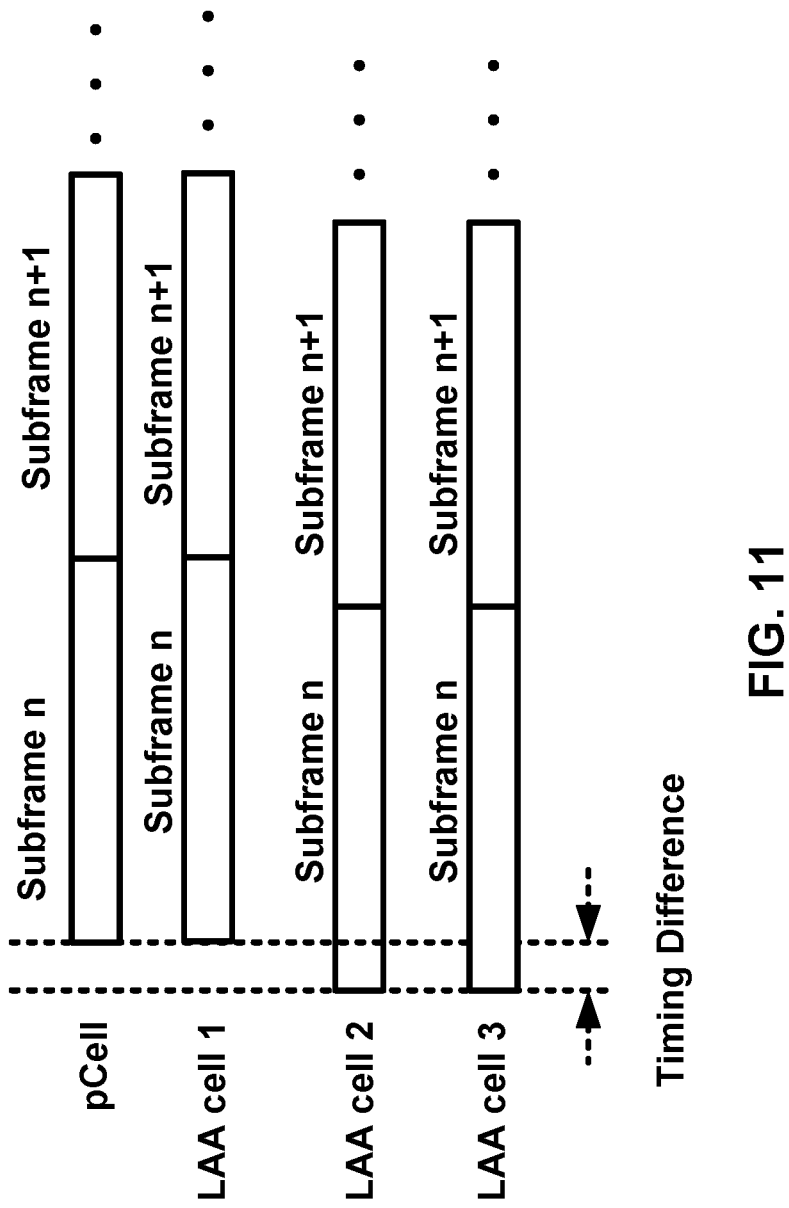
FIG. 11 is an example diagram depicting signal timing of one or more cells as per an aspect of an embodiment of the present invention.

FIG. 11 is a diagram depicting downlink reception timing of one or more cells. LAA Cell 1 and pCell may have the same received signal timing. There may be a timing difference between pCell and LAA cell 2 and LAA cell 3. For example, pCell and LAA cell 1 may be received from a first transmission point. LAA cell 2 and LAA cell 3 may be received from a second transmission point.

Figure 12:
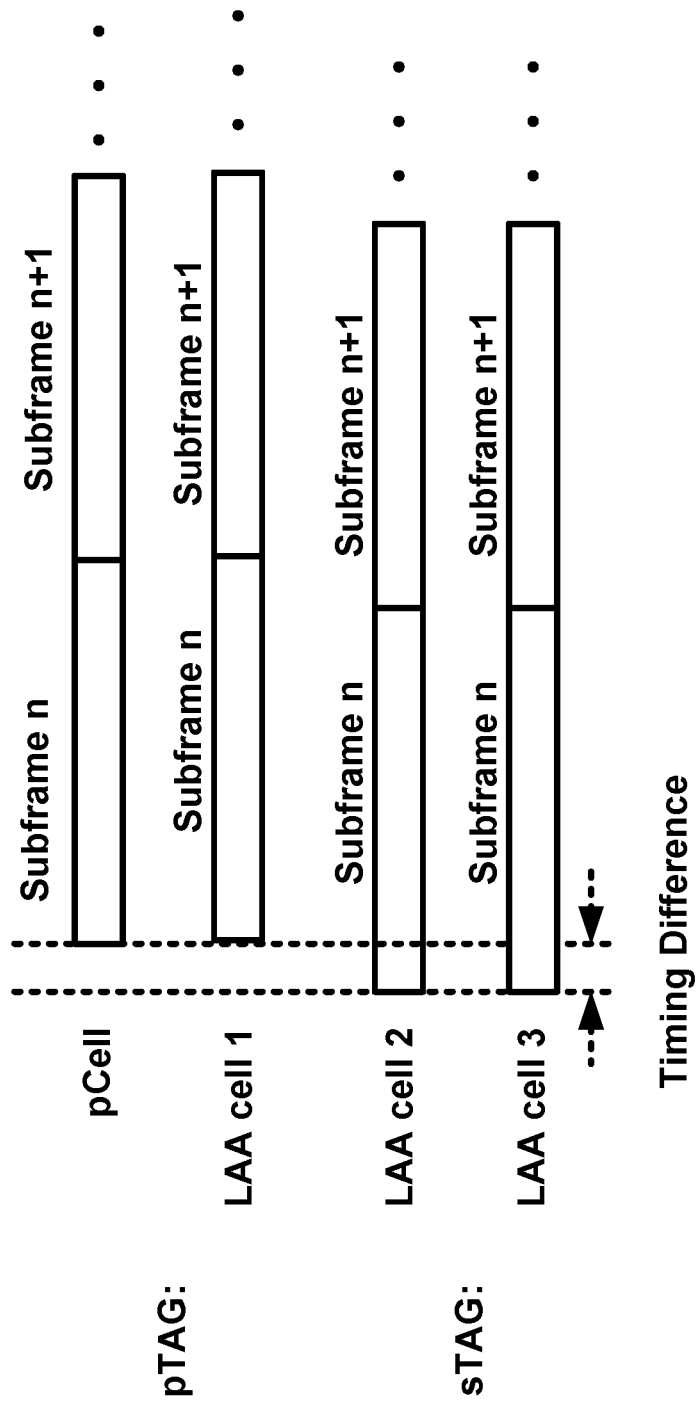
FIG. 12 is an example diagram depicting signal timing of one or more cells as per an aspect of an embodiment of the present invention.

In an example, LAA cell 2 and LAA cell 3 may be downlink only cells. Based on legacy principle LAA cell 2 and LAA cell 3 can only be grouped in a cell group including a cell with a configured uplink. For example, LAA cell 2 and LAA cell 3 may be grouped with pCell. Downlink reception timing of LAA cell 2 and LAA cell 3 is different from downlink reception timing of pCell, and LAA cell 2 and LAA cell 3 may not employ the downlink signals received at the pCell for symbol level synchronization (e.g. fine synchronization). In an example embodiment, LAA cell 2 and LAA cell 3 may be grouped in an sTAG, even though both cells are DL only cells. This is shown in FIG. 12, wherein pCell and LAA cell 1 is configured in pTAG, and LAA Cell 2 and LAA Cell 3 are configured in an sTAG. LAA Cell 2 and LAA Cell 3 may be downlink only cells. In another example, LAA Cell 2 and/or LAA Cell 3 may be configured with uplink.

FIG. 12 shows an example wherein LAA cell 2 and LAA cell 3 are two synchronized cells transmitted from the same transmission point. LAA cell 2 and LAA cell 3 may be in the same band. In an example embodiment, DL only LAA cell 2 and DL only LAA cell 3 may be grouped in an sTAG different from pTAG. LAA cell 2 and LAA cell 3 may be configured in a TAG without a cell with configured uplink. In an example embodiment, a different type of downlink grouping may be introduced for grouping LAA cell 2 and LAA cell 3 in a downlink synchronization group. FIG. 12 shows an example grouping, other example may be shown when a different number of cells and a different number TAGs with a different configuration are implemented.

FIG. 13 shows an example synchronization mechanism for unlicensed cells. The first signal may be, for example, synchronization signal, a type of reference signal, and/or discovery signal. The first signal may be, for example, DS signal used for downlink synchronization. The first signal may be employed by the UE for downlink synchronization of the received signal. The First signal may be an initial signal or burst signal including frame, subframe and/or symbol timing information. The first signal may be a downlink burst including timing information (e.g. initial signal, CRS, other types of RS, DRS, and/or other timing information). First signals transmitted by LAA cell 1 and LAA cell 2 may not have the same configuration and/or format. In an example, First signal 1 and First signal 4 transmitted on LAA Cell 1 may have different format or the same format. The First signal includes information about frame, subframe, and/or symbol timing. A UE may obtain synchronization information from the received signal timing by processing the first signal. The timing information may be employed for coarse synchronization and/or fine synchronization.

Due to LBT, LAA cells may not be able to transmit the first signal in a given subframe, or a configured window of subframes. When the first signal is not transmitted, a UE may have difficulties in synchronizing itself with the received signal. In an example embodiment, a UE may employ the first signals transmitted on LAA cell 1 and LAA cell 2 to synchronize itself with the received signal timing. FIG. 13 shows an example. When a UE employs both first signals transmitted on LAA cell 1 and LAA cell 2, the UE may receive and process more instances of the first signal for synchronization of both LAA cell 1 and LAA cell 2. This mechanism may enhance the synchronization process and accuracy.

In an example embodiment, the first signal may be DS signal. DS configuration may be the same or different on LAA cell 1 and LAA cell 2. In an example, the first signal may be initial signal, CRS, and/or downlink burst, or a combination of these signals. The first signal may include synchronization signal. The first signal may include CSI-RS signal. The first signal includes timing information of the downlink signal. In an example, LAA cell1 and LAA cell2 may be DL only cells belonging to a TAG (or a different type of grouping). In an example, one of or both of LAA cell 1 and LAA cell 2 may be configured with an uplink. FIG. 13 show two LAA cells, but the examples can be extended when more than two LAA cells and one or more cells are configured. FIG. 13 show two TAG groupings, but the examples may be extended when to a different type of grouping mechanism.

The join synchronization mechanism (e.g. in FIG. 13) may be implemented to enhance downlink synchronization. For example, the downlink synchronization may be for measurement purposes, for example, RRM or CSI measurements. The joint synchronization may be implemented for frame/subframe timing synchronization. The joint synchronization may be implemented for coarse synchronization. The joint synchronization may be implemented for symbol timing synchronization and/or fine tuning/synchronization. In an example embodiment in FIG. 13, cell 1 may employ signals of cell 2, and cell 2 may employ signals of cell 1 for downlink or uplink signal synchronization. In an example embodiment, the joint synchronization may be employed for de-activated cells. In an example embodiment, the joint synchronization may be employed for activated cells. The accuracy of the synchronization may depend on the activation status of the cells. Example embodiment may be implemented in one or both cases depending on the implementation requirements. In an example, when an example embodiment is implemented for activated cells, timing signals received from inactivated cells may not be considered for joint synchronization mechanism.

In an example embodiment, a wireless device may receive at least one control message comprising configuration parameters of a plurality of cells grouped into a plurality of cell groups. The plurality of cell groups may comprise a first cell group and a second cell group. The first cell group may comprise a first subset of the plurality of cells. Uplink transmission timing in the first cell group may be derived employing a first cell in the first cell group. The second cell group may comprise a first unlicensed cell and a second unlicensed cell in the plurality of cells. Uplink transmission timing in the second cell group may be derived employing at least a first signal received on the first unlicensed cell and a second signal received on the second unlicensed cell.

In legacy systems, when UE is configured with an sTAG, the UE may use an activated SCell from the sTAG (as a reference cell) for deriving the UE transmit timing for cells in the sTAG. Selecting a specific unlicensed cell for deriving uplink synchronization may not be a reliable choice. Synchronization signals transmitted by an eNB on an unlicensed cell is subject to LBT. The UE may have to change its reference cell quite frequently if the reference cell is an unlicensed cell. This may result in timing jitters and synchronization errors, for example, when the reference cell is changed. In an enhanced mechanism, the UE may employ the signals of more than one cell as the reference signal. This may reduce the probability of changing the reference cell and may improve the synchronization mechanism. This may reduce the frequent change of reference cell. Signals of two or more cells are employed for determining downlink reference synchronization signal and/or uplink transmission timing. In an example embodiment, the two or more cells may be required to be activated cells. Uplink signals may be transmitted on activated cells. If the timing synchronization mechanism is employed for deactivated status, the two or more cell may be activated or deactivated.

Figure 14:
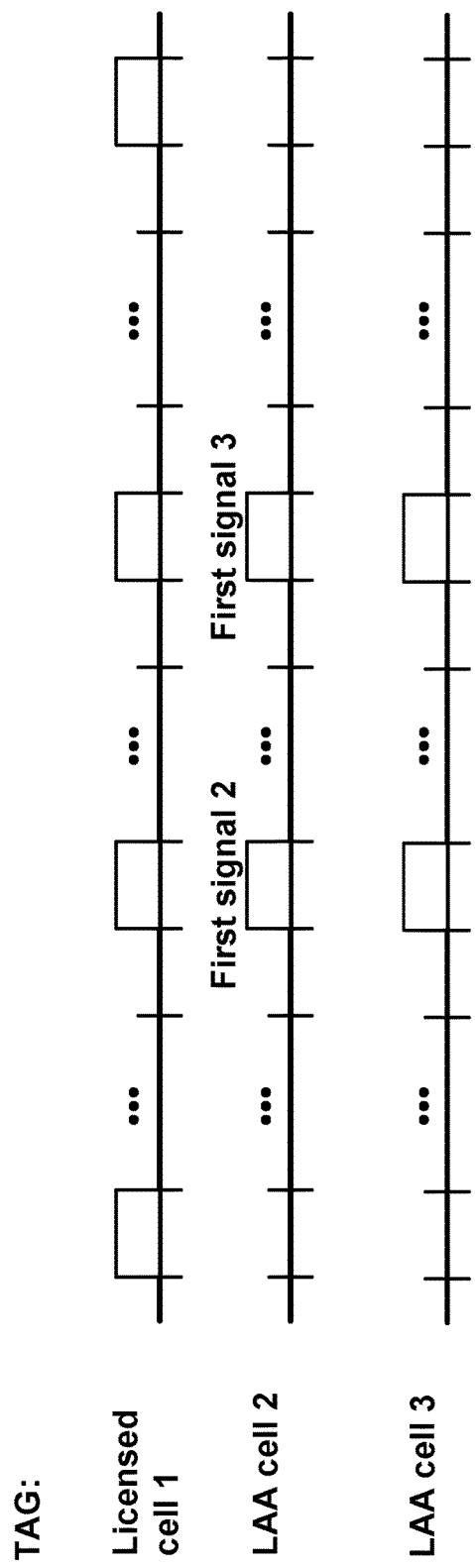
FIG. 14 is an example diagram depicting signal timing of one or more cells as per an aspect of an embodiment of the present invention.

FIG. 14 shows a configuration wherein at least one licensed cell and at least one LAA cell are configured within the same group (e.g. a TAG). In example embodiments, signal transmission in cell 1 is not subject to LBT, but signal transmission in cell 2 is subject to LBT. The UE may employ synchronization and/or reference signals received on cell 1 to synchronize itself with the signals received on LAA cell2. Cell1 and Cell2 may be transmitted from the same transmission point. In an example embodiment, licensed cell 1 may be an activated cell.

In an example embodiment, limitations may be added to the reference cell selection mechanism in a TAG. In an example embodiment, when a TAG includes one or more licensed cells and one or more unlicensed cells, the UE may choose an activated licensed cell as the timing reference (if there are any activated licensed cell in the cell group). In an example embodiment, a UE may use the PCell as the reference cell for driving the UE transmit timing for cells in the pTAG. A UE may be configured to use an activated licensed SCell from the sTAG (as a reference cell) for deriving the UE transmit timing for cells in the sTAG. A UE may not be allowed to choose an unlicensed cell as the timing reference if there is an activated licensed cell in the TAG. In an implementation, the licensed cell is considered if it is activated. In an example implementation, a UE may not use an activated unlicensed SCell from the sTAG (as a reference cell) for deriving the UE transmit timing for cells in the sTAG (if there is an activated licensed cell in the TAG). In an example transceiver, if synchronization employing de-activated cells is implemented, a deactivated licensed cell may also provide timing information. This would require changes in existing secondary carrier transceiver design.

The mechanisms implemented in example embodiments may enhance synchronization mechanism in a TAG including both licensed and unlicensed cells. Signal transmission in an unlicensed cell is subject to LBT and the eNB may not be able to transmit synchronization signals in the configured subframe or subframe window. In an example embodiment, a UE may receive a higher signal power from an unlicensed cell in a given TAG compared with an activated unlicensed cell in the given TAG. The UE may not select the activated unlicensed cell as the reference cell (if there is an activated licensed cell in the group). This may reduce the possibility of not receiving the synchronization signal due to LBT. It may reduce the possibility of changing the reference cell frequently as the air interface conditions (e.g. congestion, interference, signal level) in the LAA changes. When there is no activated licensed cell in a TAG, then the UE may select one or more unlicensed cell as the timing reference.

In an example embodiment, a wireless device may receive at least one control message comprising configuration parameters of a plurality of cells grouped into a plurality of cell groups. The plurality of cell groups comprises a first cell group and a second cell group. The second cell group may comprise one or more licensed cells and one or more unlicensed cells. The wireless device may select a first cell in the second cell group as a reference cell according to a criterion. The criterion may comprise the first cell being a licensed cell. The criterion may further comprise the first cell being an activated cell.

In an example embodiment, if there is no activated licensed cell in the second cell group, the wireless device may use one or more unlicensed cells to obtain reference timing. The wireless device may transmit uplink signals in the one or more licensed cells and the one or more unlicensed cells. Transmission timing of the uplink signals is derived employing the first licensed cell as a timing reference cell (e.g. when it is activated). When there are more than one activated licensed cell in the group, the wireless device may change the timing reference cell to a second cell. The second cell may be another activated licensed cell in the second cell group. The first cell group comprises a first subset of the plurality of cells. Uplink transmission timing in the first cell group being derived employing a first licensed cell in the first cell group. The mechanisms in example embodiments may be implemented to achieve a better fine synchronization for activated cells.

In an example embodiment, depending on the accuracy of the required synchronization (e.g. coarse synchronization) and/or whether the synchronization is employed to in-activated cells, an inactivated licensed cell may provide reference timing information for other cells in a group. The mechanisms in example embodiments may be implemented to achieve a better coarse synchronization for inactivated cells. The mechanisms in example embodiments may be implemented to achieve a better coarse synchronization. In an example embodiment, a deactivated licensed cell may provide coarse synchronization information for a deactivated unlicensed cell. The timing information may be used, for example, for RRM measurement. For example, in FIG. 14, licensed cell 1 may provide coarse timing information for LAA cell 2 and LAA cell 1, when the license cell is deactivated.

In an example embodiment, when an sTAG includes LAA cells, a UE may not be required to select a single LAA cell as the reference cell. Choosing a single licensed cell as the reference cell may result in frequent changes in the reference cell in a given TAG. Uplink transmissions in a TAG including LAA cells may employ signals received on more than one LAA cell to achieve synchronization. When a UE is configured with an sTAG including two or more unlicensed cell, the UE may not rely only on one activated LAA Cell from the sTAG (as a reference cell) for deriving the UE transmit timing for cells in the sTAG. A UE may use more than one cell in the sTAG to drive downlink reception timing and/or uplink transmission timing. If a TAG includes only one activated LAA cell, then that one activated LAA cell may be the reference for uplink transmission in the TAG.

In an example embodiment, SCells and TAGs are configured employing RRC messages. An eNB transmits one or more RRC messages to a UE to configure cells and TAGs. According to the current LTE-Advanced mechanism, sTAG configuration parameters include sTAG-Id and timeAlignmentTimerSTAG. STAG-ToAddMod-r11::=SEQUENCE {stag-Id-r11 STAG-Id-r11, timeAlignmentTimerSTAG-r11 TimeAlignmentTimer,}. TimeAlignmentTimer ::=ENUMERATED {sf500, sf750, sf1280, sf1920, sf2560, sf5120, sf10240, infinity}.

The IE TimeAlignmentTimer is used to control how long the UE considers the serving cells belonging to the associated TAG to be uplink time aligned. TimeAlignmentTimer may corresponds to the Timer for time alignment. In an example, TimeAlignmentTimer value is in number of sub-frames. For example, value sf500 corresponds to 500 sub-frames, sf750 corresponds to 750 sub-frames and so on.

In an example embodiment, a TAG including only DL LAA cells may be configured. A TAG including DL only cells may not require a TimeAlignmentTimer. TimeAlignmentTimer may correspond to alignment of uplink transmission timing. In an example embodiment, TimeAlignmentTimer is not configured, when an sTAG including DL only cells is configured. Time alignment timer may be set to infinity, or may be disabled/released for an sTAG including DL only cells.

Transmission of timing signals in an LAA cell is subject to LBT requirements Timing signals may be for example synchronization signals, reference signals, discovery signals, initial signal and/or burst indicator signals. Timing signals are transmitted in the downlink direction. A wireless device may synchronize itself with the downlink signals using the received timing information. Since the transmission of timing signals in an LAA cell is subject to LBT requirements, an eNB may not be able to receive timing signals (e.g. synch signals) for a considerable period of time. In an example scenario, the UE may lose its synchronization and may need to restart the downlink synchronization and/or search process. When a UE loses downlink synchronization it may not be able to receive downlink signals intended for the UE in a given subframe.

In an example embodiment, a timer is configured for a given cell group. The timer may indicate the synchronization status of a cell or a group of cells. The cell or the group of cells may be considered out of synch, when the timer is expired. The cell or the group of cells may be considered in-synch when the timer is running. The timer for example may be configured for an LAA cell or a cell group including one or more LAA cells. In an example, the timer may be applicable to a group of cells including only LAA cells.

In an example embodiment one or more RRC message configuring a plurality of cells and/or cell groups, may also comprise an IE for the value of the synchronization (or downlink alignment) timer. In an example, the value of downlink alignment timer may be configured for a cell, a cell group, or for a plurality of configured cells. The timer may be reset when eNB transmits a specific timing signal to the UE in a given cell or cell group.

In an example embodiment, downlink grouping may be informed using TAG configuration. For example, STAG-ToAddMod may comprise a downlink time alignment timer IE that may be used to control how long the UE considers the serving cells belonging to the associated TAG to be downlink time aligned. Downlink time alignment timer may correspond to the timer for downlink time alignment (e.g. downlink synchronization). An example configuration is shown here: STAG-ToAddMod-r11::=SEQUENCE {stag-Id-r11 STAG-Id-r11, timeAlignmentTimerSTAG-r11 Time-AlignmentTimer, DLtimeAlignmentTimerSTAG Time-AlignmentTimer2}. In an example, instead of a timer a counter may be employed, for example, counting the frames, subframes, etc.

In an example embodiment, a type of grouping different from TAG may be configured. Downlink timer/counter may be applicable to the group of cells and indicate the status of downlink synchronization for the group of cells. When the timer/counter expires the cells in the groups are considered downlink out of synch. The timer/counter of a cell or a group of cells may be restarted when the eNB transmits a timing signal on the cell or a cell in the cell group. The cells may re-start downlink synchronization, when the timer is expired. Downlink synchronization in a group of cells is performed jointly.

In an example embodiment, when downlink synchronization is expired, or for any reason the wireless device loses downlink synchronization, then both downlink and uplink time alignment may be considered expired. When a wireless device loses reference time of the downlink signals in a TAG, it may not be able to transmit uplink signals within the require time alignment. The UE may stop uplink transmissions to reduce unwanted interference to other users. The timer/counter may be configured in eNB and/or in the UE.

In an example embodiment, downlink synchronization may not be used. Instead the eNB may detect that the UE is out of synch when it does not receive a proper CSI feedback from the UE for the unlicensed cell. For example, when the eNB does not receive CSI feedback or when the eNB receives out of range CSI feedback.

In an example embodiment, an eNB may maintain the timer and employ the status of the timer to determine whether the cell is in-sync or out-of-sync. In an example embodiment, a counter may be implemented for maintaining the downlink alignment/synchronization state. The counter may be incremented when a timing signal opportunity is missed (not transmitted by eNB, or not received/decoded by the UE). When the timing signal is received the counter may be reset. When the counter reaches a preconfigured value (for example, configured by an IE in an RRC message), the eNB and/or UE may consider that it is out of synch. When the eNB and/or UE is considered out of synch, it may trigger certain actions. For example, deactivate/deconfigure/release the cell, transmit/receive a signal (e.g. RRC message, MAC/PHY signal) to inform the other node about the situation. In an example embodiment, the counter may be implemented for a group of cells. A timing signal transmitted on a cell in the group would reset the counter. The counter may determine the status of the synchronization signal for the group of cells.

Figure 15:
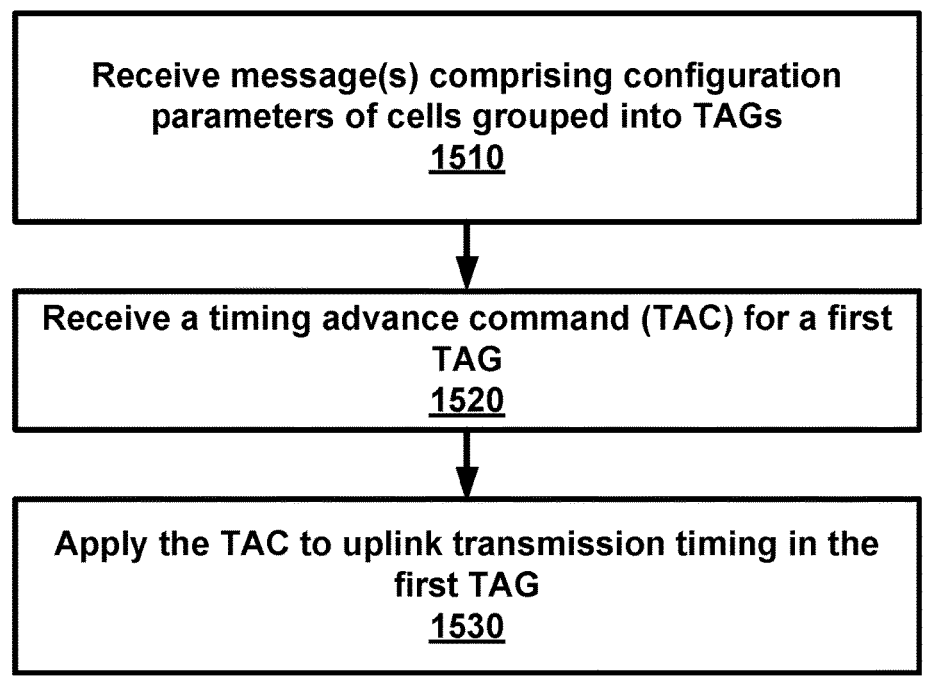
FIG. 15 is an example flow diagram as per an aspect of an embodiment of the present invention.

FIG. 15 is an example flow diagram as per an aspect of an embodiment of the present invention. The flow diagram may be processed as a method. The flow diagram may be executed by a wireless device. The wireless device may comprise one or more processors and memory storing instructions that, when executed, cause the wireless device to perform actions described in the flow diagram.

The wireless device may receive at least one message at 1510. The at least one message may comprise configuration parameters of a plurality of cells. The plurality of cells may be grouped into a plurality of timing advance groups (TAGs). The plurality of cells may comprise a plurality of downlink-uplink cells. Each of the plurality of downlink-uplink cells may have a configured uplink and a configured downlink. The plurality of cells may comprise at least one downlink-only cell. Each of the at least one downlink-only cell may have a configured downlink with no configured uplink.

At 1520, the wireless device may receive a timing advance command (TAC) for a first TAG. The wireless device may apply the TAC to uplink transmission timing in the first TAG at 1530. According to an embodiment, a TAG in the plurality of TAGs may be configurable to consist of at least one downlink-only cell if the at least one downlink-only cell is unlicensed. Otherwise, the TAG may comprise at least one downlink-uplink cell in the plurality of downlink-uplink cells.

According to an embodiment, the first TAG may comprise a first subset of the plurality of cells. Uplink transmission timing in the first TAG may be derived employing a first cell in the first TAG. According to an embodiment, a time alignment timer of a second TAG may be disabled when the second TAG consists of one or more downlink-only cells. According to an embodiment, a time alignment timer may not be configured for a second TAG when the second TAG consists of one or more downlink-only cells. According to an embodiment, at least one message may comprise a TAG index. According to an embodiment, the TAC may comprise a TAG index and a timing advance value.

According to an embodiment, a TAG in the plurality of TAGs is configurable to consist of at least one downlink-only cell if the wireless device has a first capability, otherwise each TAG in the plurality of TAGs may comprise one or more downlink-uplink cells in the plurality of downlink-uplink cells. For example, the capability may be supporting configuration of unlicensed cells cell with certain criterion, e.g. LAA cells with uplink and/or certain LTE releases, and/or certain configurations. According to an embodiment, the instructions, when executed, may further cause the wireless device to transmit a second message comprising one or more parameters indicating the first capability to a base station. According to an embodiment, the first TAG may comprise a first subset of the plurality of cells and the uplink transmission timing in the first TAG may be derived employing a first cell in the first TAG. According to an embodiment, a time alignment timer of a second TAG may be disabled when the second TAG consists of one or more downlink-only cells. According to an embodiment, a time alignment timer may not be configured for a second TAG when the second TAG consists of one or more downlink-only cells. According to an embodiment, the at least one message may comprise a TAG index. According to an embodiment, the TAC may comprise a TAG index and a timing advance value.

Figure 16:
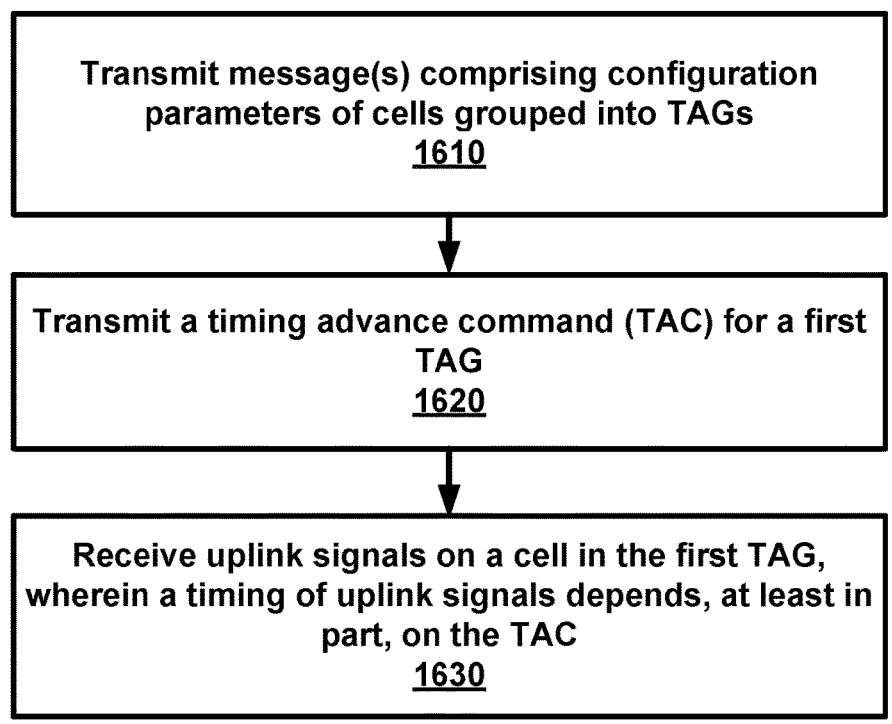
FIG. 16 is an example flow diagram as per an aspect of an embodiment of the present invention.

FIG. 16 is an example flow diagram as per an aspect of an embodiment of the present invention. The flow diagram may be processed as a method. The flow diagram may be executed by a base station. The base station may comprise one or more processors and memory storing instructions that, when executed, cause the base station to perform actions described in the flow diagram.

The base station may transmit at least one message to a wireless device at 1610. The message(s) may comprise configuration parameters of a plurality of cells grouped into a plurality of timing advance groups (TAGs). The plurality of cells may comprise a plurality of downlink-uplink cells, each of the plurality of downlink-uplink cells having a configured uplink and a configured downlink. The plurality of cells may comprise at least one downlink-only cell. Each of the downlink-only cell(s) may have a configured downlink with no configured uplink.

The base station may transmit a timing advance command (TAC) for a first TAG at 1620. The base station may receive uplink signals on a cell in the first TAG at 1630. A timing of uplink signals may depend, at least in part, on the TAC.

A TAG in the plurality of TAGs may be configurable to consist of at least one downlink-only cell if the wireless device has a first capability. Otherwise, each TAG in the plurality of TAGs may comprise at least one downlink-uplink cells in the plurality of downlink-uplink cells. According to an embodiment, the instructions, when executed, may further cause the base station to receive a second message from the wireless device. The second message may comprise one or more parameters indicating the first capability. For example, the first capability may be supporting configuration of unlicensed cells cell with certain criterion, e.g. LAA cells with uplink and/or certain LTE releases, and/or certain configurations. According to an embodiment, the first TAG may comprise a first subset of the plurality of cells, uplink transmission timing in the first TAG derived employing a first cell in the first TAG. According to an embodiment, a time alignment timer of a second TAG may be disabled when the second TAG consists of one or more downlink-only cells. According to an embodiment, a time alignment timer may not be configured for a second TAG when the second TAG consists of one or more downlink-only cells. According to an embodiment, the at least one message may comprise a TAG index. According to an embodiment, the TAC may comprise a TAG index and a timing advance value.

Figure 17:
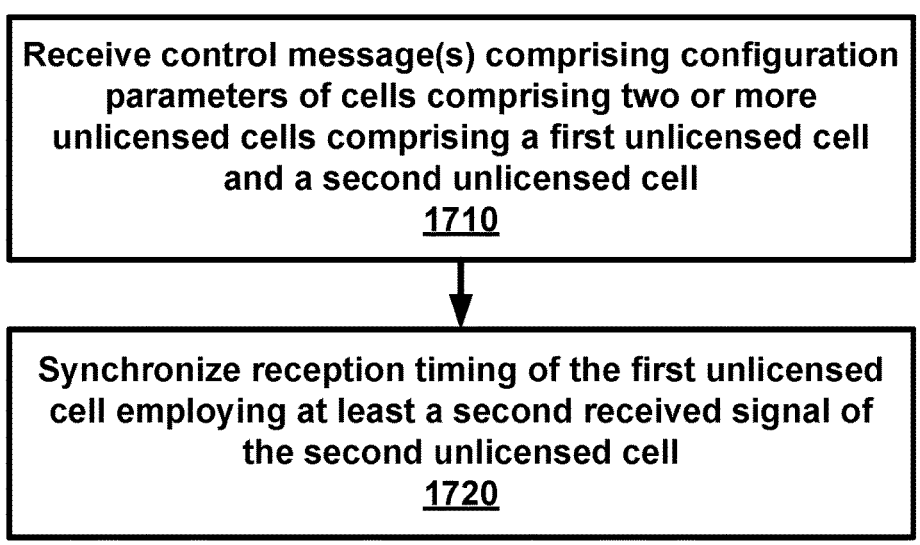
FIG. 17 is an example flow diagram as per an aspect of an embodiment of the present invention.

FIG. 17 is an example flow diagram as per an aspect of an embodiment of the present invention. The flow diagram may be processed as a method. The flow diagram may be executed by a wireless device. The wireless device may comprise one or more processors and memory storing instructions that, when executed, cause the wireless device to perform actions described in the flow diagram.

At 1710, the wireless device may receive at least one control message. The control message(s) may comprise configuration parameters of a plurality of cells. The cell(s) may comprise two or more unlicensed cells comprising a first unlicensed cell and a second unlicensed cell. At 1720, the wireless device may synchronize the reception timing of the first unlicensed cell employing at least a second received signal of the second unlicensed cell.

According to an embodiment, the instructions, when executed, may further cause the wireless device to synchronize reception timing of the second unlicensed cell employing at least a first received signal of the first unlicensed licensed cell. According to an embodiment, the second received signal may comprise a synchronization signal. According to an embodiment, the second received signal may comprise a discovery signal, a reference signal, and/or the like.

According to an embodiment, the plurality of cells may be grouped into a plurality of cell groups. The plurality of cell groups may comprise a first cell group comprising a first subset of the plurality of cells where the uplink transmission timing in the first cell group may be derived employing a first cell in the first cell group. The plurality of cell groups may comprise a second cell group comprising the first unlicensed cell and the second unlicensed cell.

According to an embodiment, the control message(s) may configure a cell group comprising the first unlicensed cell and the second unlicensed cell. According to an embodiment, a cell group may be configured at least for downlink synchronization. According to an embodiment, at least one of the two or more unlicensed cells may be a licensed assisted access (LAA) cell. According to an embodiment, a transmission of the second received signal may be subject to a listen before talk (LBT) mechanism.

Figure 18:
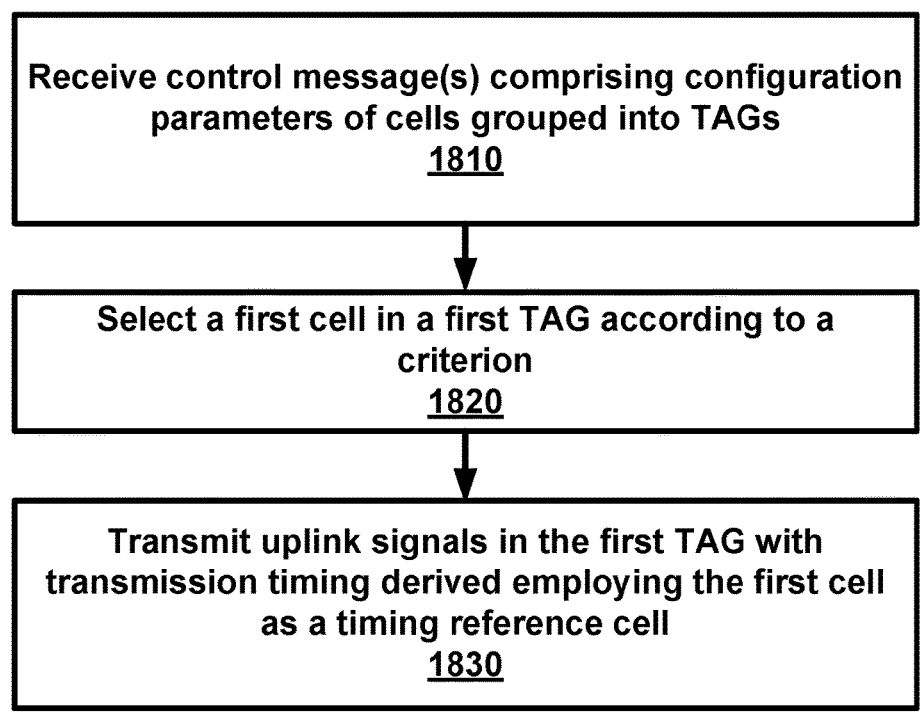
FIG. 18 is an example flow diagram as per an aspect of an embodiment of the present invention.

FIG. 18 is an example flow diagram as per an aspect of an embodiment of the present invention. The flow diagram may be processed as a method. The flow diagram may be executed by a wireless device. The wireless device may comprise one or more processors and memory storing instructions that, when executed, cause the wireless device to perform actions described in the flow diagram.

A wireless device may receive control message(s) at 1810. The control message(s) may comprising configuration parameters of a plurality of cells. The plurality of cells may be grouped into a plurality of timing advance groups (TAGs). The TAGs may comprise a first TAG.

A first cell in the first TAG may be selected according to a criterion at 1820. The TAG may comprise one or more licensed cells and one or more unlicensed cells. The criterion may comprise the first cell being licensed. According to an embodiment, the criterion may further comprise the first cell being an activated cell. According to an embodiment, the criterion may further comprise the first cell meeting signal quality criteria, e.g. having a signal level and/or signal quality indication, and/or other signal qualities meeting a threshold. According to an embodiment, the criterion may further comprise selecting an unlicensed cell in a first TAG as a first timing reference cell when the first TAG does not comprise a cell that is licensed. According to an embodiment, the criterion may further comprise selecting an unlicensed cell in a first TAG as a first timing reference cell when the first TAG does not comprise a cell that is licensed and activated.

Uplink signals in the first TAG may be transmitted at 1830. The transmission timing of the uplink signals may be derived employing the first cell as a timing reference cell. According to an embodiment, the wireless device may further comprise changing the timing reference cell to a second cell. The second cell may be an activated licensed cell in a second cell group. According to an embodiment, the uplink signals may be transmitted on at least one of the licensed cell(s) and at least one of the unlicensed cell(s). According to an embodiment, an unlicensed cell may be a licensed assisted access (LAA) cell. According to an embodiment, the wireless device may further comprise receiving a timing advance command comprising a TAG index and a timing advance value. According to an embodiment, the wireless device may apply the timing advance value to uplink transmission timing of a first TAG identified by the TAG index. According to an embodiment, the at least one message comprises a time alignment timer for the first TAG.

Figure 19:
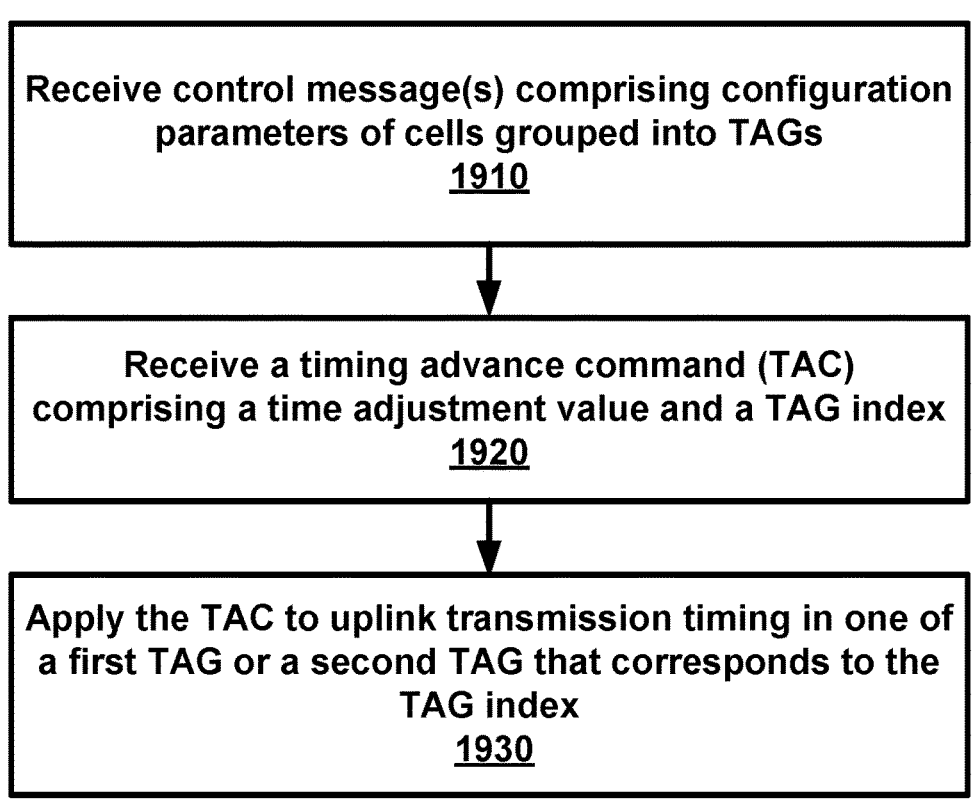
FIG. 19 is an example flow diagram as per an aspect of an embodiment of the present invention.

FIG. 19 is an example flow diagram as per an aspect of an embodiment of the present invention. The flow diagram may be processed as a method. The flow diagram may be executed by a wireless device. The wireless device may comprise one or more processors and memory storing instructions that, when executed, cause the wireless device to perform actions described in the flow diagram.

A wireless device may receive control message(s) at 1910. The control message(s) may comprising configuration parameters of a plurality of cells. The plurality of cells may be grouped into a plurality of timing advance groups (TAGs). The TAGs may comprise a first TAG and a second TAG. The first TAG may comprise a first subset of the plurality of cells. Uplink transmission timing in the first TAG may be derived employing a first cell in the first TAG. The second TAG may comprise a first unlicensed cell and a second unlicensed cell. Uplink transmission timing in the second TAG may be derived employing at least: a first signal received on the first unlicensed cell; and a second signal received on the second unlicensed cell.

A timing advance command (TAC) received at 1920. The TAC may comprise a time adjustment value and a TAG index. The TAC may be applied to the uplink transmission timing at 1930 in one of the first TAG or the second TAG that corresponds to the TAG index.

According to an embodiment, an unlicensed cell may be a licensed assisted access (LAA) cell. According to an embodiment, the second TAG may not comprise an activated licensed cell. According to an embodiment, the message(s) may comprise the TAG index. According to an embodiment, the message(s) may comprises a time alignment timer for the TAG. According to an embodiment, the first TAG may comprise an unlicensed cell.

According to an embodiment, the first signal may comprise at least one of the following: a synchronization signal, a discovery signal, or a reference signal. According to an embodiment, the second signal may comprise at least one of the following: a synchronization signal, a discovery signal, or a reference signal. According to an embodiment, a transmission of the first signal or the second signal may be subject to a listen before talk (LBT) mechanism. According to an embodiment, the wireless device may further comprise selecting a second cell in the first TAG as a timing reference when a first criterion is met. The second uplink transmission timing in the first TAG may be derived employing the second cell.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran™, Java™, Basic, Matlab™ or the like) or a modeling/simulation program such as Simulink™, Stateflow™, GNU Octave™, or LabVIEWMathScript™. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

What is claimed is:

1. A wireless device comprising:
one or more processors; and
memory storing instructions that, when executed, cause the wireless device to:
receive at least one message comprising configuration parameters of a plurality of cells grouped into a plurality of timing advance groups (TAGs),
wherein the plurality of cells consisting of:
a plurality of downlink-uplink cells, each of the plurality of downlink-uplink cells having a configured uplink and a configured downlink; and
at least one downlink-only cell, each of the at least one downlink-only cell having a configured downlink with no configured uplink; and
wherein a TAG is configurable to consist of one or more downlink-only cells if the wireless device has a first capability, otherwise each TAG comprises one or more downlink-uplink cells in the plurality of downlink-uplink cells;
receive at least one timing advance command (TAC) for a first TAG; and
apply the TAC to uplink transmission timing of at least one downlink-uplink cell in the first TAG.

2. A wireless device of claim 1, wherein the instructions, when executed, further cause the wireless device to transmit a second message to a base station, the second message comprising one or more parameters indicating the first capability.

3. The wireless device of claim 1, wherein the first TAG comprises a first subset of the plurality of cells, uplink transmission timing in the first TAG being derived employing a first cell in the first TAG.

4. The wireless device of claim 1, wherein time alignment timer of a second TAG is disabled when the second TAG consists of one or more downlink-only cells.

5. The wireless device of claim 1, wherein time alignment timer is not configured for a second TAG when the second TAG consists of one or more downlink-only cells.

6. The wireless device of claim 1, wherein the at least one message comprises a TAG index for a TAG.

7. The wireless device of claim 1, wherein the TAC comprises a TAG index and a timing advance value.

8. A wireless device comprising:
one or more processors; and
memory storing instructions that, when executed, cause the wireless device to:
receive at least one message comprising configuration parameters of a plurality of cells grouped into a plurality of timing advance groups (TAGs),
wherein the plurality of cells consisting of:
a plurality of downlink-uplink cells, each of the plurality of downlink-uplink cells having a configured uplink and a configured downlink; and
at least one downlink-only cell, each of the at least one downlink-only cell having a configured downlink with no configured uplink; and
wherein a TAG is configurable to consist of one or more downlink-only cells if the one or more downlink-only cells are unlicensed cells, otherwise the TAG comprises one or more downlink-uplink cells in the plurality of downlink-uplink cells;
receive at least one timing advance command (TAC) for a first TAG; and
apply the TAC to uplink transmission timing of at least one downlink-uplink cell in the first TAG.

9. The wireless device of claim 8, wherein the first TAG comprises a first subset of the plurality of cells, uplink transmission timing in the first TAG being derived employing a first cell in the first TAG.

10. The wireless device of claim 8, wherein time alignment timer of a second TAG is disabled when the second TAG consists of one or more downlink-only cells.

11. The wireless device of claim 8, wherein time alignment timer is not configured for a second TAG when the second TAG consists of one or more downlink-only cells.

12. The wireless device of claim 8, wherein the at least one message comprises a TAG index for a TAG.

13. The wireless device of claim 8, wherein the TAC comprises a TAG index and a timing advance value.

14. A base station comprising:
one or more processors; and
memory storing instructions that, when executed, cause the base station to:
transmit at least one message comprising configuration parameters of a plurality of cells grouped into a plurality of timing advance groups (TAGs),
wherein the plurality of cells consisting of:

a plurality of downlink-uplink cells, each of the plurality of downlink-uplink cells having a configured uplink and a configured downlink; and at least one downlink-only cell, each of the at least one downlink-only cell having a configured downlink with no configured uplink; and wherein a TAG is configurable to consist of one or more downlink-only cells only if the wireless device has a first capability, otherwise each TAG comprises one or more downlink-uplink cells in the plurality of downlink-uplink cells;

transmit at least one timing advance command (TAC) for a first TAG; and receive uplink signals on a cell in the first TAG, wherein a timing of uplink signals depends, at least, on the at least one TAC.

15. A wireless device of claim 14, wherein the instructions, when executed, further cause the base station to receive a second message from a wireless device, the second message comprising one or more parameters indicating the first capability.

16. The base station of claim 14, wherein the first TAG comprises a first subset of the plurality of cells, uplink transmission timing in the first TAG being derived employing a first cell in the first TAG.

17. The base station of claim 14, wherein time alignment timer of a second TAG is disabled when the second TAG consists of one or more downlink-only cells.

18. The base station of claim 14, wherein time alignment timer is not configured for a second TAG when the second TAG consists of one or more downlink-only cells.

19. The base station of claim 14, wherein the at least one message comprises a TAG index for a TAG.

20. The base station of claim 14, wherein the TAC comprises a TAG index and a timing advance value.

* * * * *